United States Patent
Borras et al.

(10) Patent No.: US 8,281,169 B2
(45) Date of Patent: Oct. 2, 2012

(54) METHOD AND SYSTEM FOR POWER MANAGEMENT FOR A HANDHELD MOBILE ELECTRONIC DEVICE EXECUTING-IN-PLACE AN APPLICATION KERNEL FROM EXECUTE-IN-PLACE NON-VOLATILE MEMORY (XIP NVM)

(75) Inventors: Jaime Andres Borras, Miramar, FL (US); Zaffer S. Merchant, Parkland, FL (US); Jose M. Fernandez, Sunrise, FL (US)

(73) Assignee: Wireless Silicon Group, Inc., Fort Lauderdale, FL (US)

( * ) Notice: Subject to any disclaimer, the term of this patent is extended or adjusted under 35 U.S.C. 154(b) by 487 days.

(21) Appl. No.: 12/547,549

(22) Filed: Aug. 26, 2009

(65) Prior Publication Data

US 2010/0058087 A1    Mar. 4, 2010

Related U.S. Application Data

(60) Provisional application No. 61/092,329, filed on Aug. 27, 2008.

(51) Int. Cl.
  G06F 1/00   (2006.01)
  G06F 1/32   (2006.01)
  G06F 13/00  (2006.01)
(52) U.S. Cl. .......... 713/322; 713/320; 711/100
(58) Field of Classification Search ............. 713/322
  See application file for complete search history.

(56) References Cited

U.S. PATENT DOCUMENTS

| | | | |
|---|---|---|---|
| 5,519,843 A | 5/1996 | Moran et al. | |
| 5,754,817 A * | 5/1998 | Wells et al. | 711/203 |
| 6,480,929 B1 * | 11/2002 | Gauthier et al. | 711/105 |
| 6,574,747 B2 * | 6/2003 | Ginsberg | 714/6.13 |
| 6,615,303 B1 | 9/2003 | Endo et al. | |
| 6,631,394 B1 | 10/2003 | Ronkka et al. | |
| 6,674,443 B1 | 1/2004 | Chowdhuri et al. | |
| 6,763,458 B1 | 7/2004 | Watanabe et al. | |
| 7,017,004 B1 * | 3/2006 | Calligaro et al. | 711/102 |
| 7,076,675 B2 | 7/2006 | Perez et al. | |
| 7,117,306 B2 * | 10/2006 | Rudelic | 711/118 |
| 7,124,262 B2 * | 10/2006 | Kadi | 711/156 |

(Continued)

FOREIGN PATENT DOCUMENTS

GB   2251324 A   7/1992

(Continued)

OTHER PUBLICATIONS

A. Anand, C. Manikopoulos, Q. Jones, and C. Borcea. A Quantitative Analysis of Power Consumption for Location-Aware Applications on Smart Phones. In Proceedings of the 2007 IEEE International Symposium on Industrial Electronics, Jun. 2007.

(Continued)

*Primary Examiner* — Suresh Suryawanshi

(74) *Attorney, Agent, or Firm* — Guntin Meles & Gust, PLC; Pablo Meles

(57) ABSTRACT

Methods (10, 70, 90, and 100) and systems (50, 80, 150, and 200) for enhancing user experiences on a mobile device use non-volatile execute-in-place memory (60, 160, 207) to provide faster boot-up, reduce current drain, improve security, and facilitate storage decisions that all enhance the operation of the mobile device for a user. Methods and systems embodied herein can include power management for handheld mobile electronic devices. Other embodiments are disclosed.

18 Claims, 15 Drawing Sheets

U.S. PATENT DOCUMENTS

| | | |
|---|---|---|
| 7,134,118 B1 | 11/2006 | McNutt |
| 7,234,052 B2 | 6/2007 | Lee et al. |
| 7,356,677 B1 | 4/2008 | Rafizadeh |
| 7,533,374 B2 * | 5/2009 | Rudelic et al. ............... 717/151 |
| 7,624,260 B2 | 11/2009 | Ethier et al. |
| 7,689,820 B2 | 3/2010 | Pierce et al. |
| 7,804,435 B2 * | 9/2010 | Sadowski et al. ............. 341/155 |
| 7,814,485 B2 | 10/2010 | Morgan et al. |
| 7,853,826 B2 | 12/2010 | Bramley et al. |
| 7,904,897 B2 * | 3/2011 | Rudelic ......................... 717/171 |
| 7,971,081 B2 * | 6/2011 | Cooper et al. ................ 713/320 |
| 2002/0078338 A1 | 6/2002 | Lay et al. |
| 2003/0115443 A1 | 6/2003 | Cepulis et al. |
| 2004/0193864 A1 * | 9/2004 | Tsai et al. ......................... 713/1 |
| 2004/0225876 A1 | 11/2004 | Lam |
| 2004/0255283 A1 | 12/2004 | Rudelic et al. |
| 2005/0132123 A1 | 6/2005 | Glaum et al. |
| 2005/0132179 A1 | 6/2005 | Glaum et al. |
| 2005/0182922 A1 | 8/2005 | Guo et al. |
| 2006/0064576 A1 | 3/2006 | Chen |
| 2006/0101194 A1 | 5/2006 | Malueg et al. |
| 2006/0129861 A1 | 6/2006 | Kee et al. |
| 2006/0133362 A1 | 6/2006 | Stein et al. |
| 2007/0043938 A1 | 2/2007 | May et al. |
| 2007/0233933 A1 | 10/2007 | Wang et al. |
| 2007/0243937 A1 | 10/2007 | Hernandez |
| 2007/0294550 A1 | 12/2007 | May et al. |
| 2008/0059823 A1 * | 3/2008 | Balatsos et al. ............... 713/323 |
| 2008/0077786 A1 | 3/2008 | Pierce et al. |
| 2009/0132764 A1 | 5/2009 | Moll et al. |

FOREIGN PATENT DOCUMENTS

| | | |
|---|---|---|
| JP | 11298550 | 10/1999 |
| JP | 2003167656 | 6/2003 |
| JP | 2004013299 | 1/2004 |
| JP | 2005107938 | 4/2005 |
| WO | 0067132 | 9/2000 |

OTHER PUBLICATIONS

Bez, R.; Camerlenghi, E.; Modelli, A.; Visconti, A., "Introduction to Flash Memory", Apr. 2003, IEEE, 91 Issue 4, pp. 489-502.

Sun-Hoi Hur; Chul-Hi Han, "Nonvolatile SRAM cell using different capactiance loading", Feb. 5, 1998, IEEE, 34 Issue 3, pp. 251-253.

Benavides, T., et al., "The Enabling of an Execute-In-Place Architecture to Reduce the Embedded System Memory [8] Footprint and Boot Time." Journal of Computers, vol. 3, No. 1, pp. 79-89, Jan. 2008.

* cited by examiner

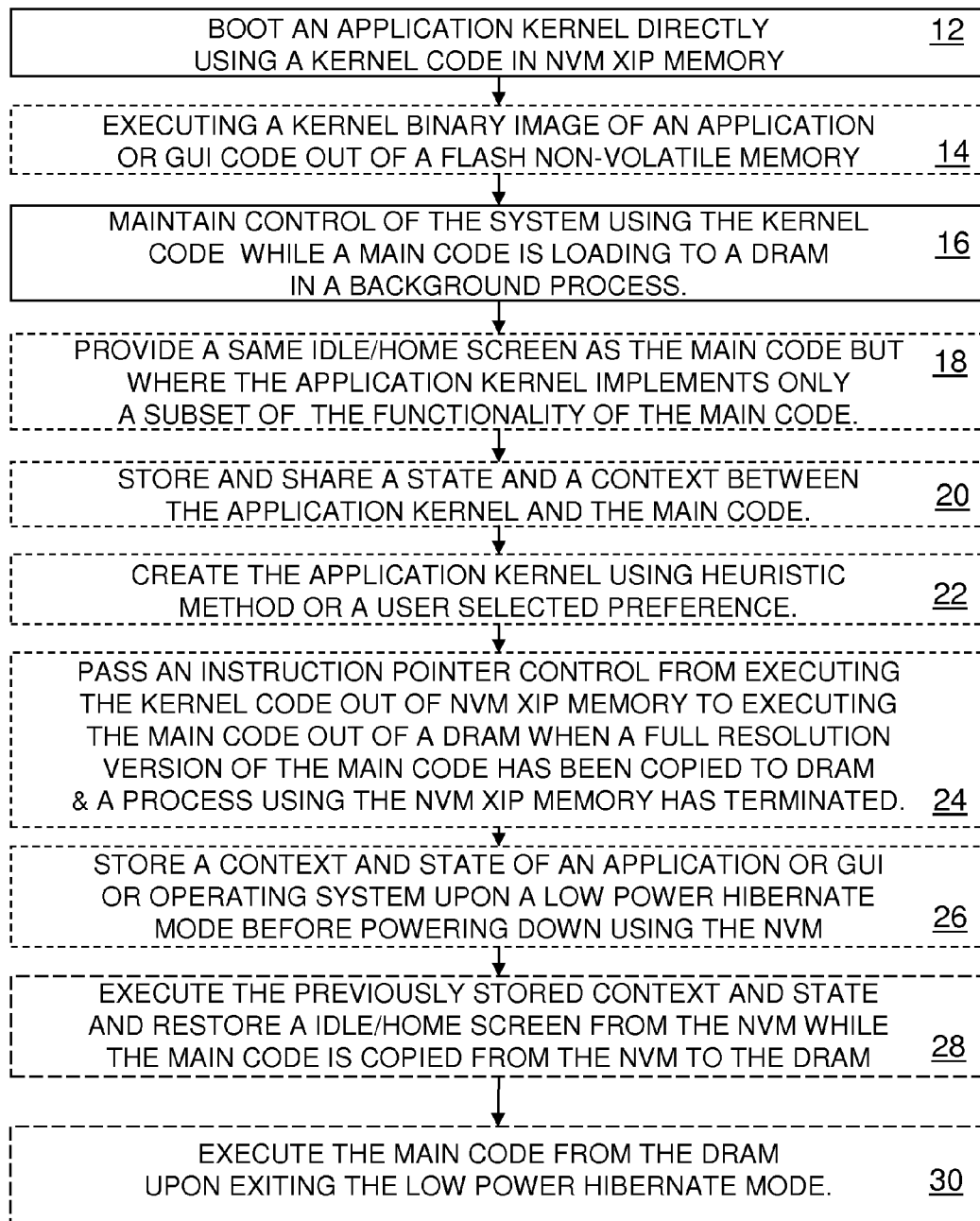

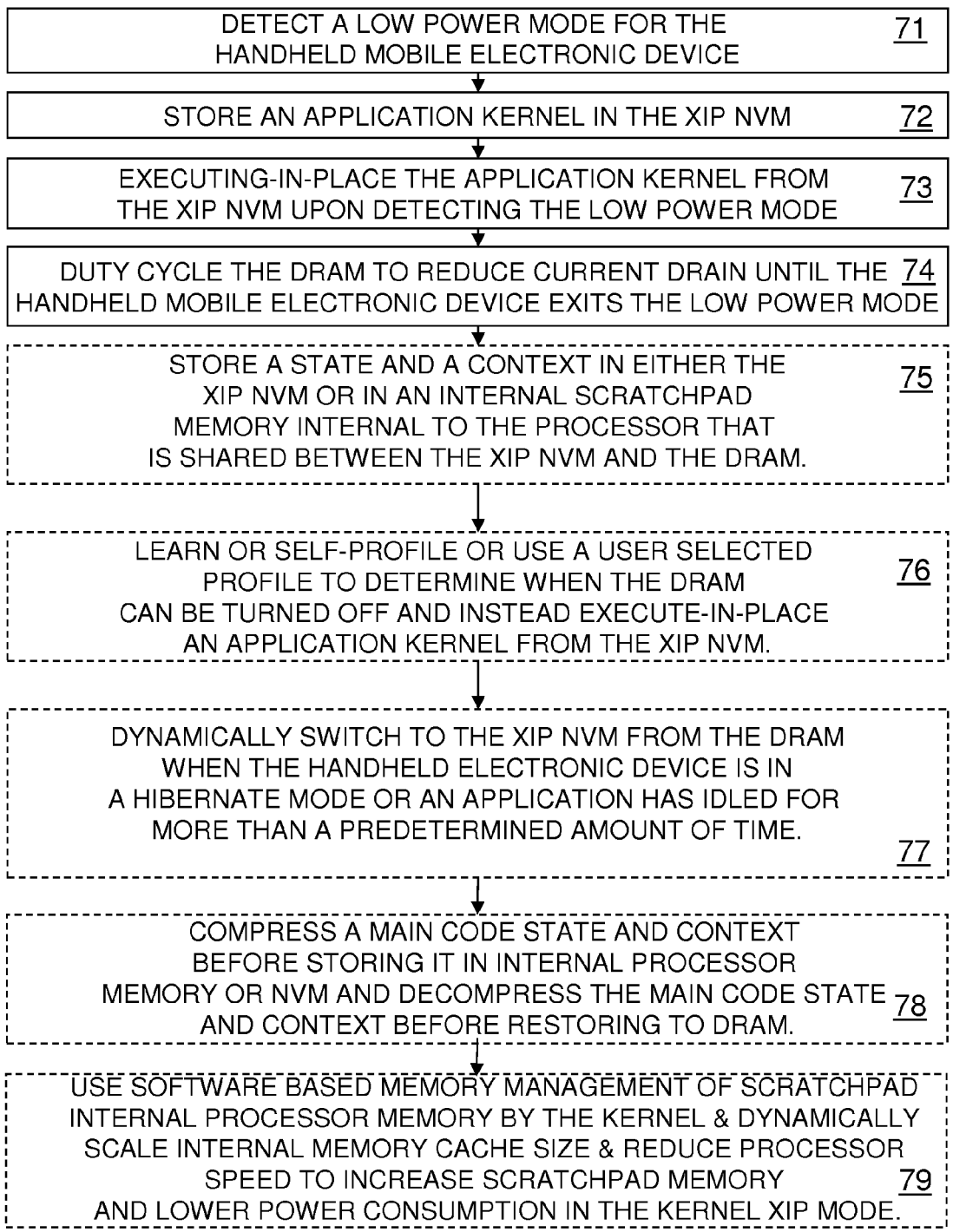

210

400

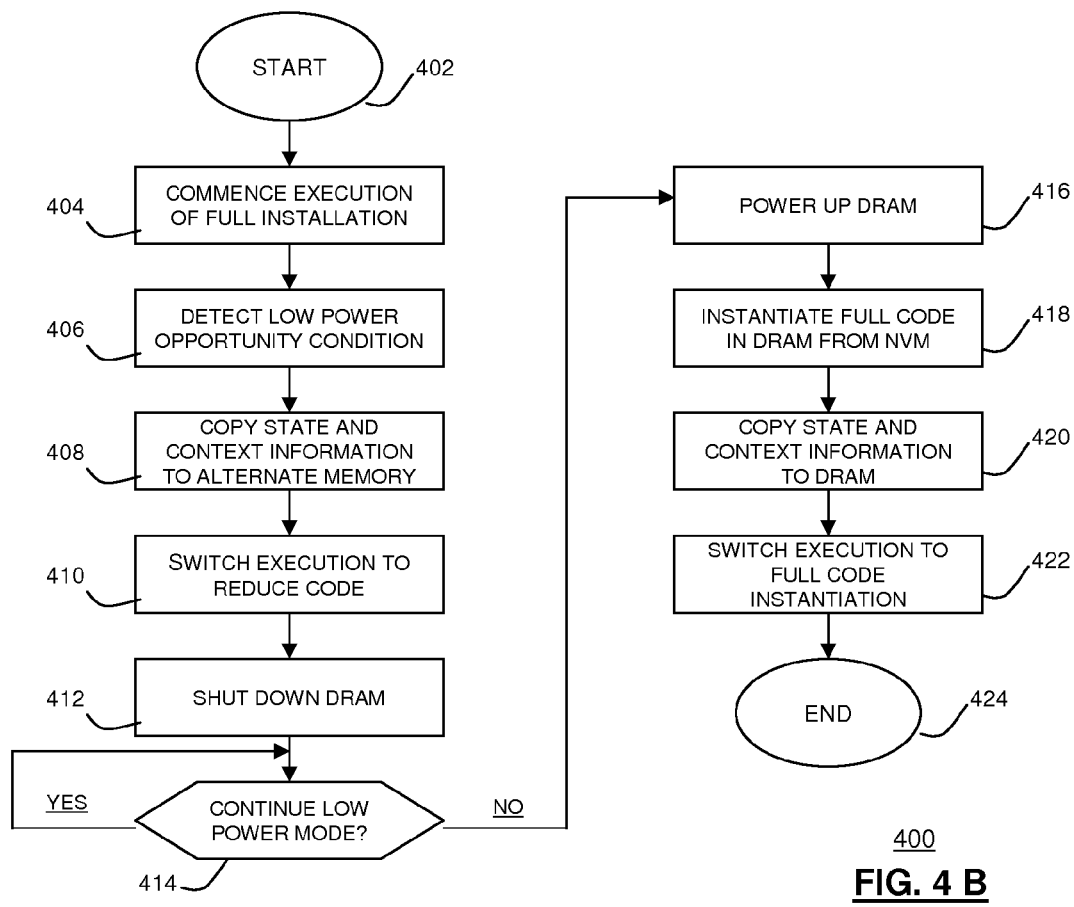

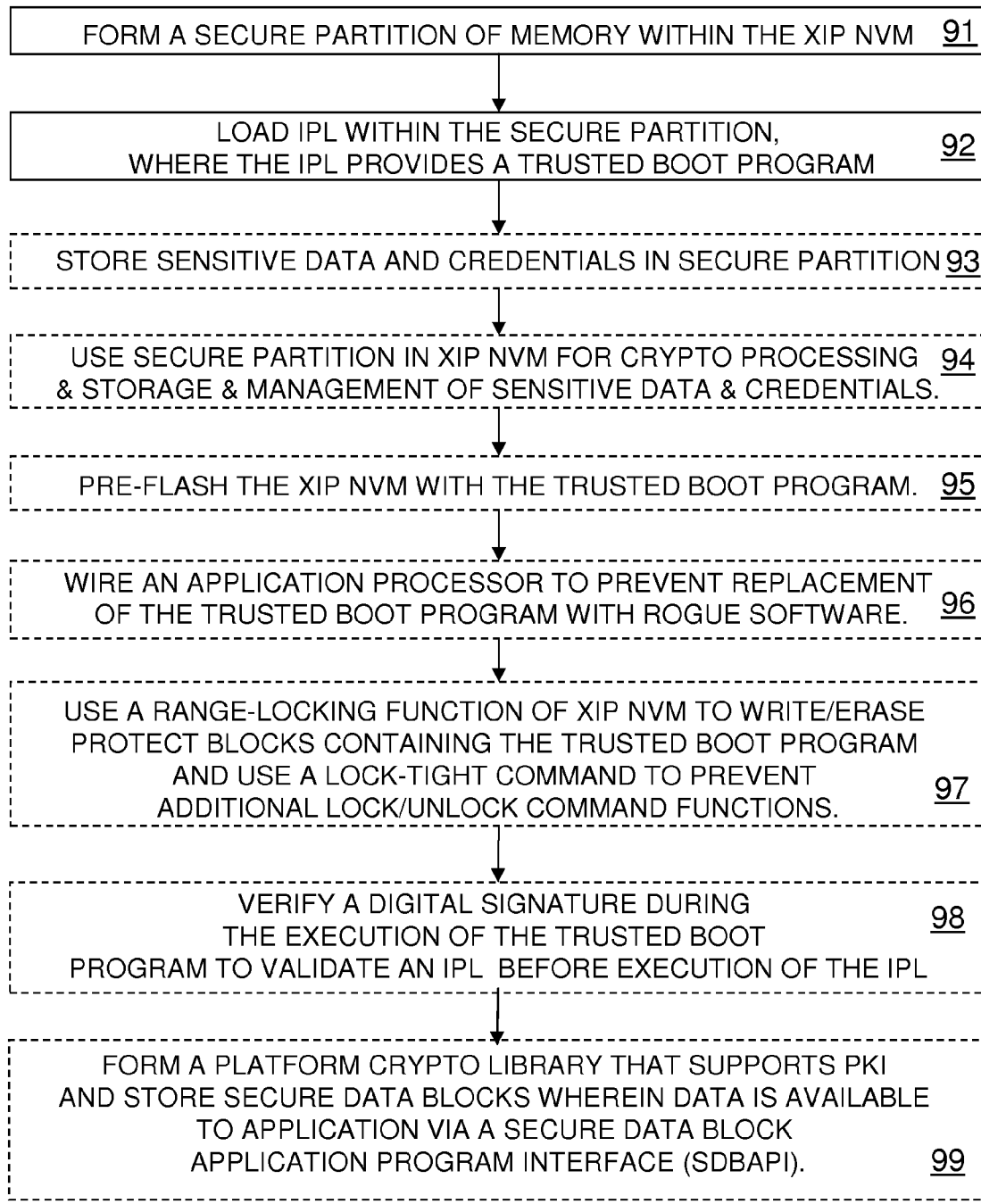

METHOD AND SYSTEM FOR POWER MANAGEMENT FOR A HANDHELD MOBILE ELECTRONIC DEVICE EXECUTING-IN-PLACE AN APPLICATION KERNEL FROM EXECUTE-IN-PLACE NON-VOLATILE MEMORY (XIP NVM)

CROSS-REFERENCE TO RELATED APPLICATIONS

This application claims the priority of U.S. Provisional Application No. 61/092,329, which was filed on Aug. 27, 2008 and which is incorporated herein in its entirety. This Application is further related to U.S. patent application Ser. No. 12/207,168, entitled "Method and Apparatus for an Active Low Power Mode of a Portable Computing Device", and to U.S. patent application Ser. No. 12/207,106 entitled "Method and Apparatus for Fast Booting a Portable Computing Device Allowing for Immediate Operation", both applications were filed on Sep. 9, 2008 and both applications which are assigned to the assignee of the present application.

FIELD

These embodiments relate generally to memory systems using non-volatile (NVM) execute-in-place (XIP) memories and methods thereof for operating a mobile device using such NVM XIP memories, and more particularly to methods and systems that enhance a user experience on a mobile device such as a wireless device using NVM XIP memories by providing power management for mobile electronic devices.

BACKGROUND

New memory technologies are enabling methods and systems as described herein that can enhance the user experience on mobile devices. More particularly, low power double data rate (LP-DDR) non-volatile memory has special characteristics which may promote such devices as the storage devices of choice for next generation handheld applications with promises of enabling high performance, improved security with even longer battery life time and more which have yet to be developed until now. JEDEC, the leading technology standards association for the solid-state industry hosted a standardization meeting in Munich, Germany, Aug. 27-31, 2007, focusing primarily on memory-related topics. Focus topics included LPDDR2 volatile dynamic read access memory (DRAM) and non-volatile memory (NVM). JEDEC, via its subcommittee JC-42.6, is defining a low power volatile and non-volatile memory standard (the latter described as "LPDDR2"), with the intent that the devices be bus-compatible, share the same operating frequencies and command protocol to facilitate controller design to accommodate the two device types on a single bus. Through this emerging standard, it is expected that an increase in the use of both volatile and non-volatile memory, in low power products, will result with a reduction in component counts and power.

Some applications will use LPDDR2 DRAM in combination with NAND flash memory on different buses. LPDDR2, however, has the unique property of being defined from the beginning to support both DRAM and nonvolatile memory on the same external memory bus. That allows systems using LPDDR2 memory to tap NVM to store the operating system and applications and to execute code directly out of the NVM device without downloading it into SDRAM first. Such an "execute in place" (XIP) architecture can provide significant advantages if implemented appropriately within the context of a handheld device.

Note that the PC memory road map looks to improve the PC memory performance in PC systems but sometimes at the detriment or without full consideration of the appropriate needs of an embedded system. PC memory density is also growing at a rate that is beyond the needs of some embedded systems. For these reasons, with each successive generation of PC memory, it is anticipated that usage will move from PC memory to LPDDR memory, even if those embedded systems do not necessarily need the low-power features offered by LPDDR.

Portable electronic computing systems have evolved over the years from ROMized embedded systems with a small amount of RAM to the now conventional flash and RAM based systems that more resemble general purpose computing systems, having the ability to store and execute various application programs. The conventional three main factors considered in the design of these systems are cost, size, and power consumption. In recent years, the desire to load and execute application programs and other functions has driven the design towards a general operating system with ability to operate web browsers, portable code such as Java™, and other applications. A Java operating environment for such devices has been standardized, and is known as Java 2 Micro Edition (J2ME).

Presently, conventional small computing devices, including smart cellular phones, personal digital assistants (PDAs), and palm-top computers, use a non-volatile flash memory (NVM) to store a boot kernel and other operating system elements, application software, user interface (UI) elements, and data. This conventional NVM is typically NAND type memory, which makes it block-addressable, and not byte-addressable like RAM or standard ROM. Being block addressable, it requires a dedicated bus to the application processor. Upon start-up, the processor must load the operating kernel from the NVM into RAM, which is connected to the application processor by a separate bus. This arrangement causes a significant load time upon turning on a device before a user can start operating the device. User's notice the long "power up" time while they wait for the device to be ready to use after pressing the "on" button. This wait time can be somewhat annoying, and in emergency situations waiting up to a minute may be critical.

Prior to using NAND flash NVM, other arrangements were used, including ROM. However, ROM doesn't allow the device to be updated, or applications to be installed, so that approach has been discarded. A NOR memory type flash NVM has been used, which is byte-addressable, connected to the same bus as "pseudo-RAM" and allowing "execute in place" (XIP) operation, but NOR type flash is significantly more expensive than NAND flash, and is not as durable (in lifetime write operations), so that approach also fell out of favor.

FIG. 1A shows a block schematic diagram 100 of an architecture for use in present conventional portable devices. A processor 102 is coupled to a NAND type flash NVM 104 via a first bus 106. The processor 102 is further coupled to a dynamic RAM (DRAM) 108 via a second bus 110. Upon powering up the device, the processor begins copying operating system and other instruction code from the flash to the DRAM, and indicated by arrow 112. Often the boot load copied to the DRAM is in compressed form to reduce memory footprint in the flash memory, thus requiring the boot kernel to be decompressed prior to instantiating it in the DRAM. This arrangement allows the device to have a general operating system to allow the addition of new application programs, as well as updates to the system software. It allows for use of less expensive NAND flash memory, as well as low cost DRAM type memory.

However, using two busses requires interface pins on the processor for each of the busses, causing the size of the processor integrated circuit to be larger than if just one bus were used. Furthermore, while the block-addressable NAND flash is less expensive, having to copy blocks from the flash, decompress them, and copy them to the DRAM takes a substantial amount of time. Therefore there is a need for an architecture that eliminates a bus interface, and reduces the start up time upon powering up the device.

Summaries of the Various Embodiments for Enhancing Handheld Device User Experience Using NVM XIP Memories As a result of the development of the enabling technology of NVM XIP memories with the LP-DDR2 interface, several novel and nonobvious embodiments of inventions have been created herein that enhance a user experience on handheld or wireless devices. Below is a non-exhaustive list of such concepts:

1. Method and System for Fast Boot-up based on decomposition of the application/GUI into a kernel binary image that is executable-in-place from NVM Flash memory.
2. Method and System for Operating in Low-Power mode with Selection of Execute-in-Place Application Kernel running in Flash NVM and Duty Cycling external DRAM to reduce current drain.
3. Method for using Execute-in-Place Flash NVM for providing a high security device architecture.
4. Software Virus filter Algorithm for Multi-Media cellular phone or electronic device
5. Storage Algorithm for Multimedia Mobile Device
6. Method and System for Reducing Power Consumption in Mobile Electronic Devices using Execute-In-Place Non-Volatile Memory The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

The terms "program," "software application," and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system. The "processor" as described herein can be any suitable component or combination of components, including any suitable hardware or software, that are capable of executing the processes described in relation to the inventive arrangements.

Other embodiments, when configured in accordance with the inventive arrangements disclosed herein, can include a system for performing and a machine readable storage for causing a machine to perform the various processes and methods disclosed herein.

BRIEF DESCRIPTION OF THE DRAWINGS

Each of the embodiments listed above will be described below in further detail with further reference to the attached figures.

FIG. 1A is a prior art computer architecture for a portable computing device;

FIG. 2A is a computer architecture for a portable computer device, in accordance with an embodiment of the invention;

FIG. 3A is a memory diagram of an execute in place kernel, in accordance with an embodiment of the invention;

FIG. 4A is a flow chart diagram of a method of booting up a portable computing device, in accordance with an embodiment of the invention;

FIG. 5A is user interface for selecting an application to be included in an execute in place kernel, in accordance with an embodiment of the invention; and FIG. 6A is a flow chart diagram of a method of selecting an application to be included in an execute in place kernel, in accordance with an embodiment of the invention.

FIG. 1B is a computer architecture for a portable computer device, in accordance with an embodiment of the invention;

FIG. 2B is a memory diagram of the DRAM and a low power memory for switching execution from the DRAM to the low power memory, in accordance with an embodiment of the invention;

FIG. 3B is a tracking table for use in determining when to switch execution from the DRAM to the low power memory, in accordance with an embodiment of the invention;

FIG. 4B is a flow chart diagram of a method of switching execution from a DRAM to a low power memory to reduce operating power consumption, in accordance with an embodiment of the invention.

DETAILED DESCRIPTION OF THE DRAWINGS

Figure 1:
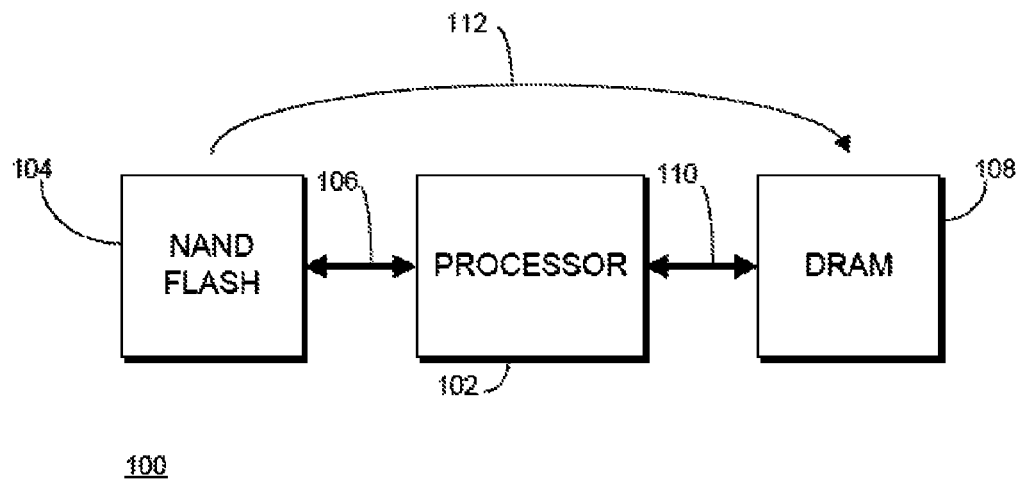
FIG. 1 is a flow chart of a method of rapid system bootup in an embedded system in accordance with an embodiment of the present invention.

While the specification concludes with claims defining the features of embodiments of the invention that are regarded as novel, it is believed that the invention will be better understood from a consideration of the following description in conjunction with the figures, in which like reference numerals are carried forward.

Embodiment 1: Method and System for Fast Boot-Up Based on Decomposition of the Application/GUI into a Kernel Binary Image that is Executable-In-Place from NVM Flash Memory.

Embodiments herein can be implemented in a wide variety of exemplary ways that can significantly enhance a user experience. In particular, a method and system for Fast Boot-up based on decomposition of the application/GUI into a kernel binary image that is executable-in-place from NVM Flash memory can improve upon the current user experience. Power-Up Boot times for large embedded systems such as Smartphones and Mobile Internet Devices is increasing and takes tens of seconds for such a system to respond with the Idle/Home Screen to a User. Embodiments herein can significantly reduce the Power-Up Boot time by and much as an order of magnitude by using Flash NVM execute-in-place memory. This is in contrast to long power-up boot time for large embedded software systems that typically require application/GUI code to be shadowed from Flash NVM into SDRAM in order to execute. Examples of large embedded architecture software systems can include Linux, Window-Mobile and the Symbian operating systems.

The Power-up Boot time for large embedded systems running applications and Graphical UI with large memory footprints, such as in a Smartphone and Mobile Internet Device, can take tens of seconds to respond with the Idle/Home Screen resulting in long wait times and consequently less than optimal user experience. The reason for the long boot-up time is that the application/GUI executable code must first be transferred from Flash-based Non Volatile Memory (NVM) into DRAM before it can start executing.

The embodiments herein significantly reduce the power-up boot time by executing a kernel binary image of the application/GUI code directly out of Flash NVM while a main binary image is copied into DRAM as a background process thereby providing a much faster response for the Idle/Home Screen to the User. The kernel version of the application/GUI code is designed and built specifically to execute-in-place out of Flash NVM and provides the same Idle/Home screen look-and-feel as the main version but implements only a subset of the functionality thereby enabling the user to start interacting with the device much sooner than waiting for the main version to be shadowed from Flash NVM into DRAM. The subset of the full functionality that is implemented in the Flash NVM version can be determined using heuristic methods or can be user selectable. Once a full-resolution version of the main code has been copied into DRAM and the corresponding process has terminated then the instruction pointer control is passed from executing the kernel version out of Flash (NVM) to executing the main code out of DRAM.

In order for a seamless transition from the kernel Flash NVM executable version to the main DRAM executable version, state variables and other related information pertaining to application/GUI is shared between the two processes. This sharing (of state and also context) enables the state machine for the main DRAM version to be configured to start using the same application/GUI context that the kernel Flash NVM version had when it stopped executing, making the transition seamless for the User. This can provide for a consistent GUI between the kernel code and the main code. Additionally, functions that are inactive or disabled while executing from the application kernel in NVM can be "stubbed" or illustrated to indicate temporary inactivity. For example, a video or camera icon can be illustrated as being grayed out while the device is operating the application kernel from the NVM. Alternatively, a waiting symbol (e.g., a clock dial) can be illustrated if a user attempts to activate a function that is temporarily inactive or unavailable during the XIP of the application kernel.

In addition to improving Power-up Boot Time, the embodiments herein also intended to improve Power-Up Resume Time from Low-Battery Hibernate mode. During Low Battery Hibernate, the system stores the OS/application/GUI context into Flash (NVM) before powering down the system to Hibernate and restores it to DRAM when power is restored. Here again, on power-up, the kernel Flash NVM binary image is executed using the previously stored system state and context to speed up the response time for restoring Idle/Home Screen while the main version is being copied from Flash to DRAM. Note the Flash NVM binary image can contain a subset of the main code. In the case of a smartphone, the Flash NVM binary image or application kernel can include code for operating voice, push-to-talk operations and a browser for example. The higher processor or current drain intensive functions such as video or multimedia can be left out of the application kernel.

Figure 2:
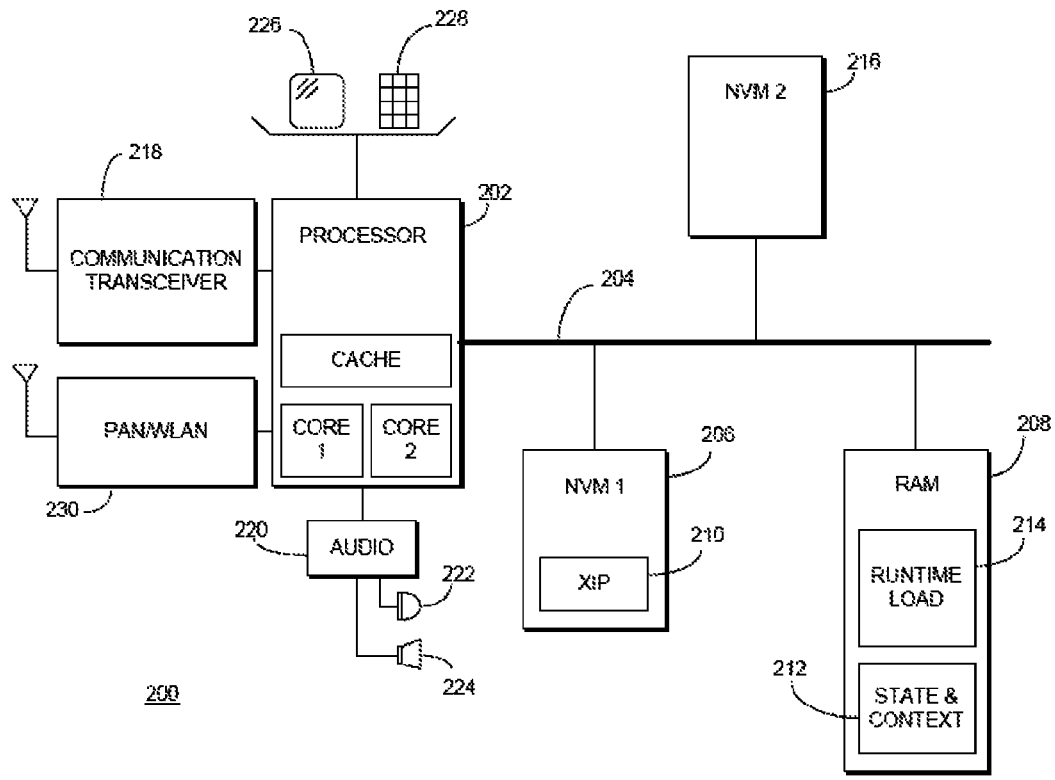
FIG. 2 is an illustration of a system of rapid bootup in an embedded system in accordance with an embodiment of the present invention.
Figure 1:
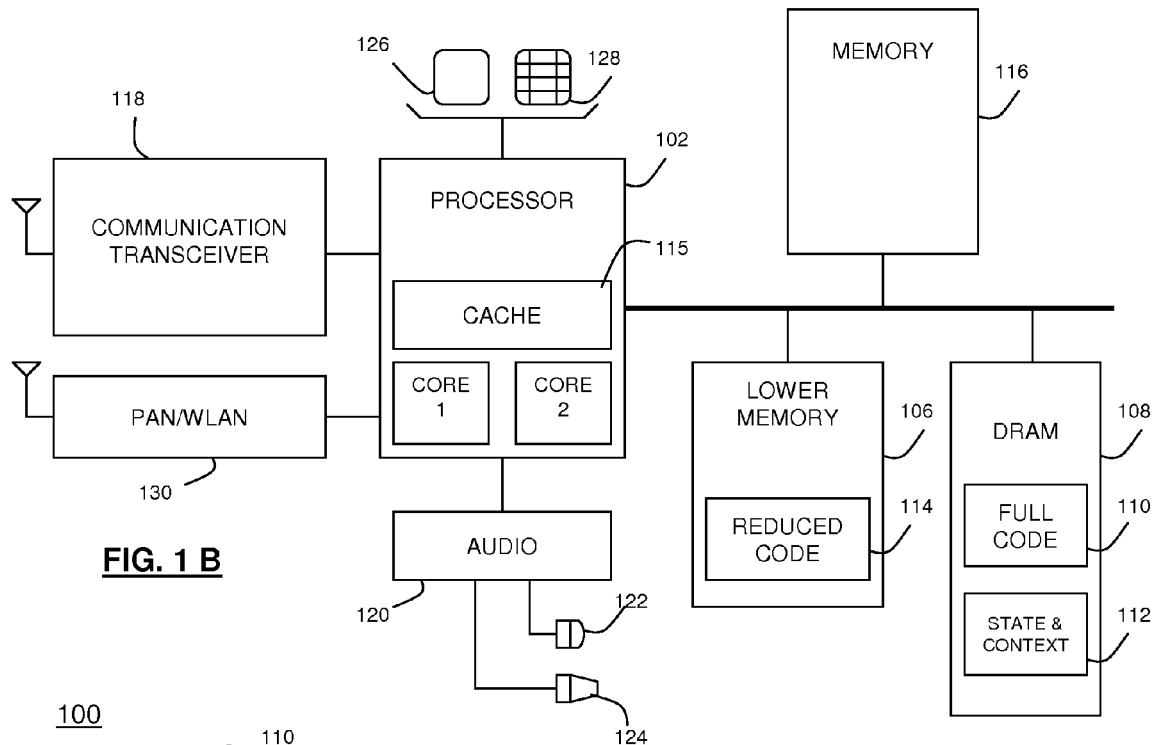
Figure 2:
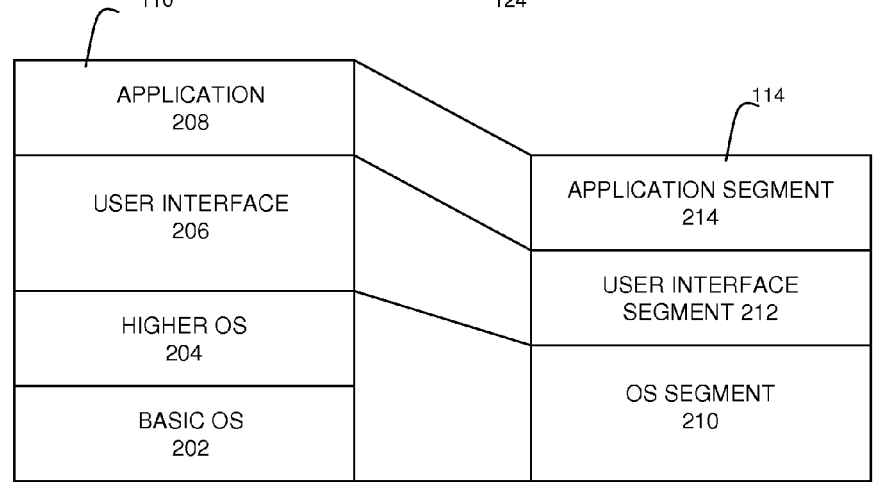
Figure 2:
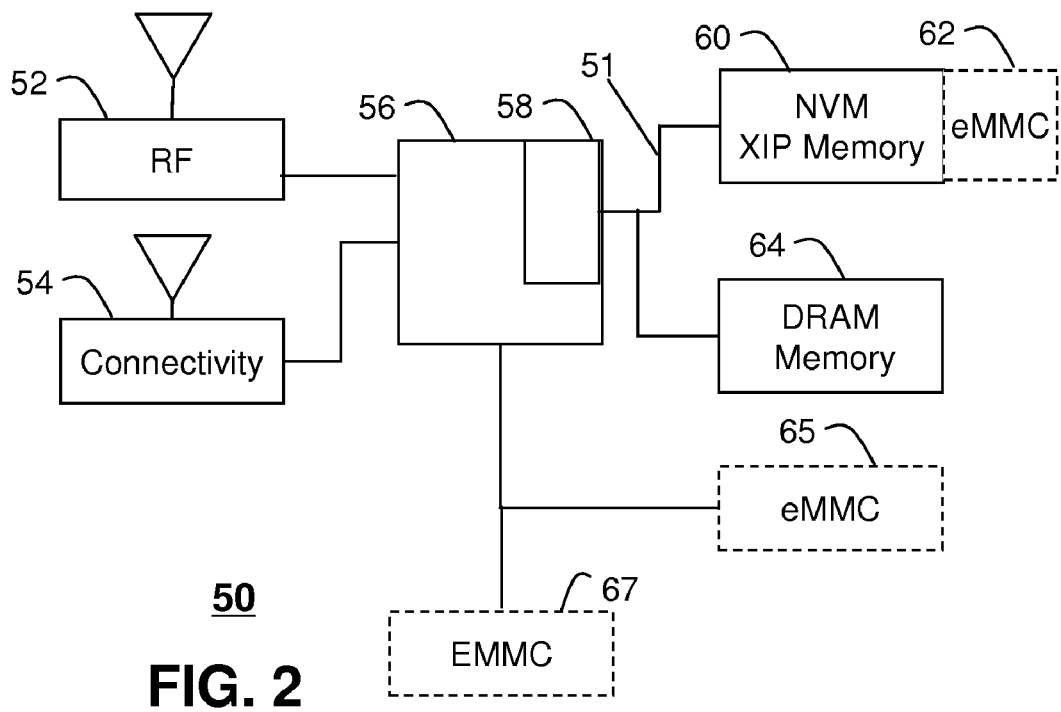

Referring to FIG. 1, a method 10 of rapid system bootup in an embedded system as illustrated in FIG. 2 can include the steps of booting an application kernel directly using a kernel code in non-volatile execute in place memory at step 12 and maintaining control of the system using the kernel code while a main code is loading to a dynamic random access memory in a background process at step 16. The step of booting the application kernel can involve executing a kernel binary image of an application or GUI code out of a flash non-volatile memory at step 14. The application kernel can provide a same Idle/Home screen as the main code but implements only a subset of the functionality of the main code as shown at step 18. The method 10 at step 20 can further store and share a state and a context between the application kernel and the main code. At step 22, the application kernel can be created using a heuristic method or can be created based on a user selected preference. The method 10 can further comprise the step 24 of passing an instruction pointer control from executing the kernel code out of non-volatile execute in place memory to executing the main code out of a dynamic random access memory when a full resolution version of the main code has been copied to the dynamic random access memory and a process using the non-volatile execute in place memory has terminated. The method 10 can further comprise the step 26 of storing a context and state of an application or GUI or operating system upon a low power hibernate mode before powering down the system using the NVM, executing the previously stored context and state and restoring a Idle/Home screen from the NVM while the main code is copied from the NVM to the DRAM at step 28, and executing the main code from the DRAM upon exiting the low power hibernate mode at step 30.

In another embodiment and with reference to FIG. 2, a system of rapid bootup in an embedded system 50 can include a processor or controller 56 for the embedded system, a non-volatile memory (NVM) 60 capable of executing in place and coupled to the controller 56, a dynamic random access memory (DRAM) 64 coupled to the controller where the NVM 60 and the DRAM 64 share a bus 51. The system can be programmed to boot an application kernel directly using a kernel code in the NVM and maintain control of the system using the kernel code in NVM while a main code is loading to the DRAM in a background process. The system can essentially otherwise similarly operate in a manner as previously described above with respect to the method of rapid bootup. The system 50 can be any number of handheld or mobile wireless devices such as a laptop computer, a smartphone, a PDA or any number of other handheld devices. In the case of a smartphone for example, the system 50 can further include a transceiver or RF module 52 and can optionally include a local connectivity module 54 which can communicate with other system using any number of wired or wireless protocols (such as Bluetooth or WiFi). The processor or controller 56 can include on-board memory 58 such as cache memory that can be used for scratchpad memory or for other purposes as can become apparent further below. The system 50 can optionally include an embedded multimedia card (eMMC) 65 that can include any number of applications and/or data files. The eMMC 65 can generally serve as mass storage for multimedia applications and/or files. In yet another embodiment, the eMMC 65 can be eliminated and replaced with a partitioned portion 62 of the NVM SIP memory 60. Optionally, such a system can include an External Multimedia Card (EMMC) 67 that can share the same bus and operate similarly to the eMMC 65.

In another aspect of the embodiments, a method of rapid system bootup in an embedded system can also be used when experiencing a system lock-up or during a hot re-boot or dynamic re-boot "on the fly." In such a method, the system can detect a system lock-up or a request for a hot re-boot while a main code is operating from a dynamic random access memory. Once the system lock-up or hot re-boot condition is detected, the system can switch to an application kernel stored in a non-volatile execute in place memory and then execute in place the application kernel directly from the non-volatile execute in place memory. This would improve the end-user experience by quickly bringing the system back up from the lock-up or hot re-boot condition using the application kernel stored in NVM.

The present invention discloses a solution for the problem of long start up times in portable computing devices. More specifically, the invention includes a processor, and non-volatile memory, and a volatile memory all coupled together via a common bus. The non-volatile memory includes an execute in place kernel which the processor is configured to begin executing immediately upon powering up the device. The execute in place kernel includes an operating system segment, user interface segment, and application segment. Once execution of the execute in place commences, a user interface is presented, and a user of the device has access to the applications in the application segment. Since the execute in place kernel is executed immediately upon powering up the device, the user has immediate use of the applications in the application segment. While the execute in place kernel is being executed, the processor maintains state and context information for all processes and applications being executed. The state and context data is maintained in the volatile memory. In addition as the execute in place kernel is executed, the processor begins copying a runtime load into the volatile memory. The runtime load includes code elements used in the execute in place kernel, in addition to other software elements. Once the runtime load is instantiated in the volatile memory, execution switches from the non-volatile memory to the volatile memory. The state and context information is vectored to execution of the runtime load in the volatile memory in a seamless manner. A user of the device is therefore able to immediately use some functions of the device due to the execute in place, and once execution switches to the volatile memory the user will have full operation capability.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" "device" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring now to FIG. 2A, here is shown a computer architecture 200 for a portable computer device, in accordance with an embodiment of the invention. A processor 202 is coupled to a common bus 204. A non-volatile memory 206 and volatile memory 208 are further coupled to the common bus 204. The non-volatile memory is byte addressable, and may be implement by, for example, a NOR type flash memory. The volatile memory may be a dynamic random access memory (DRAM). The volatile memory may conform to the Joint Electron Devices Engineering Council (JEDEC) specification referred to as LP DDR2, which allows a clock speed of up to 533 MHz and an operating voltage of 1.2 volts.

Accordingly, the processor 202, common bus 204, and non-volatile memory 206 are configured to operate at the same clock speed and operating voltage as the volatile memory.

To facilitate immediate functionality of the device upon the user powering up the device, the non-volatile memory 206 includes an execute in place (XIP) kernel 210 stored therein. The processor 202 is configured to commence execution of the XIP kernel immediately upon being powered up. The XIP kernel must therefore include basic operating system elements. The XIP is configured in one embodiment of the invention to provide limited functionality as the boot process commences, until full functionality is achieved, as will be described. The XIP kernel therefore comprises user interface elements and application elements. The user interface elements provide a user interface which appears substantially the same as the user interface will appear once full functionality is achieved, although some features of the user interface may not be available while executing the XIP kernel. Any function which is not active in the XIP version of the user interface or applications may be shown, but grayed out to indicate the function is not presently available.

Once execution of the XIP kernel commences, the processor maintains state and context information 212 in the volatile memory. The state and context information is produced by execution of processes and applications of the XIP kernel, as is known. The XIP kernel further configures the processor to commence loading a runtime load 214 into the volatile memory. The runtime load is the full featured version of the operating system, user interface, and applications. The runtime load may be loaded from compressed form in the non-volatile memory 206. As the XIP is executed, the runtime load is loaded as a background process, shadowing the XIP kernel, but including additional functionality as well. Once the runtime load is instantiated in the volatile memory, execution is switched from the XIP kernel 206 to the runtime load 214. Switching execution to the runtime load is facilitated by vectoring the state and context information to the appropriate addresses, such that the transition is not substantially noticeable to the user of the device, other than additional functionality becomes available. Any application being executed from the XIP kernel continues being executed, but from identical code in the runtime load, along with any additional functionality.

Since, in one embodiment, the non-volatile memory 206 is a NOR type flash memory, which does not typically have the write cycle durability of a NAND flash memory, and since the user may install and uninstall applications and data into the device, it is contemplated that in one embodiment of the invention a second non-volatile memory 216, which is a NAND type flash memory, be used for mass storage. In such an arrangement, the compressed runtime load and other code may be stored in compressed form in the second non-volatile memory 216. As the XIP kernel is executed, then, the processor is configured to load the runtime load from the second non-volatile memory into the volatile memory.

The device 200 may be any one of a variety of portable computing devices, including personal digital assistants, cellular phones including so called "smart" phones, palm top computers, and on. The exemplary embodiment illustrated in FIG. 2 is that of a communication device, such as cellular phone. Accordingly, the device includes a communication transceiver 218, and an audio processor 220. The communications transceiver includes the necessary baseband processor, modulator and demodulator, amplifier, filters, and antenna to communicate over cellular communication networks. Acoustic signals from, for example, the voice of a user of the device are received at a microphone 222 and converted to a digital audio signal, which may be passed to the communication transceiver for transmission. Similarly, modulated audio signals received by the communication transceiver may be demodulated, and passed to the audio processor, which converts them to analog form to be played over a speaker 224, such as an earpiece speaker.

To facilitate operation of the device, input/output elements such as a graphical display 226 and a keypad 228 and other buttons may be provided. The graphical display present information to the user in visual form, and the keypad allows the user to information into the device, as well as select options presented on the graphical display, as is known.

In the present embodiment, it is expected that user of the device may desire to make a phone call upon powering up the device. Accordingly, one application that will then be included in the XIP kernel is a calling application which allows the user make and receive phone calls. Since the application is included in the XIP kernel, the user will be able to use the device for calling immediately upon powering up the device. The calling application may include access to a phone book or contact list, speed calling, as well as the basic support for carrying out calling activity.

It is further contemplated that the device may include a local or personal area network transceiver 230. The transceiver 230 may be used for a variety of applications, including connecting to data networks, wireless accessories, and so on. Voice calling over data networks may be supported using the transceiver 230.

Referring now to FIG. 3A, there is shown a memory diagram of an XIP kernel 210, in accordance with an embodiment of the invention. The XIP kernel includes an initial operating system segment comprised of a basic operating system segment 302 and higher operating system segment 304. The XIP kernel further includes an initial user interface segment 306 and an initial application segment 308. The basic OS segment includes code for establishing, for example, a timing system, basic input and output operation, and so on. Higher OS code provides, for example, higher level operating system support, communication with other components of the device, and the process which loads the runtime load into the volatile memory, as well as the code for maintaining state and context information, and code or switching execution to the volatile memory at the appropriate time. The user interface segment includes all user interface elements necessary for presenting the user with a functioning interface, including graphical elements for a graphical user interface, and menuing functions. The user interface segment is designed such that the interface presented is substantially the same as will be presented upon executing the runtime load, with the exception that some functions may not be available. Those options which are not available in the XIP kernel user interface may be shown, but grayed out, for example. The application segment 308 includes code for application programs which are to be immediately available to the user. The application code may be optimized versions of applications to reduce the memory footprint by removing some functions of the application. As with non-functional user interface elements, non-functional features of applications may be shown, but not active, and grayed out. It is contemplated that the user may select applications to be included in the application segment. The user may have certain favorite applications, such as, for example, and email application. Thus at least one of the applications in the XIP kernel may have been selected by the user during a previous power cycle.

FIG. 4A is a flow chart diagram of a method 400 of booting up a portable computing device, in accordance with an embodiment of the invention. At the start 402, the device is powered off. Accordingly, the user must first power up the device (404). Powering up the device may be performed by, for example, pressing a power button, which causes power voltage to be applied to various circuits and components of the device, including the processor, non-volatile memory, and the volatile memory. Once the processor, non-volatile memory, and volatile memory are powered up, the processor immediately commences executing the XIP kernel (406). As the XIP kernel is executed, several processes may be performed in parallel. For example, the processor maintains state and context information in the volatile memory (408). At the same time, the processor commences instantiating the runtime load into the volatile memory (410). In one embodiment of the invention, the processor 202 is a multi-core processor, having 2 cores, for example. A first core may be used for executing the XIP kernel, such as the user interface elements and application elements, while the second core may be used for loading the runtime load into volatile memory. Once the runtime load is finished loading in the volatile memory, execution is switched from the non-volatile memory to the runtime load in the volatile memory (412). State and context information is vectored over to execution of the runtime load. Any applications of the XIP kernel in process will continue being executed, but from code in the runtime load. Likewise the state of the user interface will remain unchanged, providing a "seamless" transition from the initial boot period to the regular operating mode with full functionality. The complete boot operation is then complete and the method terminates (414).

FIG. 5A shows user interface for selecting an application to be included in an execute in place kernel, in accordance with an embodiment of the invention. The user interface shown is exemplary of a cellular phone interface, and is presented during full operation, when the processor is executing from the volatile memory, after the boot period. The user selects an application to indicate which applications are to be included in the XIP kernel. In the present example applications 1-3 are shown, each on its own line with a corresponding selector box. Application 1 has been selected. Accordingly, the code for application 1 may then stored in the XIP kernel. FIG. 6A is a flow chart diagram of a method 600 of selecting an application to be included in the XIP kernel, in accordance with an embodiment of the invention. As indicated in FIG. 5A, the user first selects one or more applications to be made available at startup (602). Once the selections are made the application code for each selected application may be optimized for memory space by removing the code for certain features (604). The XIP kernel must then be reconfigured, and rewritten (606), and then stored in the non-volatile memory (608). It is contemplated that the optimization process and reconfiguring may be performed with the aid of a general purpose computer, to which the device may be connected.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In summary, a handheld electronic device can provide a fast boot-up by having an application kernel XIP while a main application code is decompressed and loaded into DRAM. The State and Context can be shared between the Kernel and Main executables. The content of the kernel can be fixed, but can also utilize learning based Kernel Dynamic Profiling and/or User Selectable profiles to define the kernel code. As part of providing a seamless transition between executing kernel and main code, a consistent GUI can be provided between kernel and the main code based on either Stub-out or Wait for Main methods. The seamless transition between executing Kernel and executing Main code can be achieved using stored State and Context information. Note further that the system can also switch to executing the application Kernel from NVM during system Lock-ups and Re-boot (Hot Re-boot)

Embodiment 2: Method and System for Operating in Low-Power Mode with Selection of Execute-In-Place Application Kernel Running in Flash NVM and Duty Cycling External Dram to Reduce Current Drain.

By using Flash NVM execute-in-place memory and Duty Cycling external DRAM operation with the Execute-in-Place Application Kernel in Flash NVM, current drain can be reduced significantly.

Referring again to FIG. 2, the embodiments herein enable dynamic and/or user mode selection for low-power operation to extend the battery life for Smartphones and Mobile Internet Devices. The system 50 achieves low-power operation by duty cycling power to the DRAM 64 and performing a mode switch for executing-in-place an Application Kernel binary image of the OS/application/GUI code directly from Flash NVM 60 and utilizing a small and efficient Scratchpad SRAM Memory Cache 58 that is internal to the Application Processor 56.

The low-power Application Kernel version of the main application/GUI code can be designed and built specifically to execute-in-place out of Flash NVM and provides a reduced but consistent version of the Idle/Home screen look-and-feel as the main version but with only the priority or critical applications enabled for device operation such as Voice Telephony, Push-to-Talk (PTT), Messaging and Browser. The set of applications and functionality selected to build the XIP Application Kernel in Flash NVM can be determined by minimal use of Scratchpad memory cache size requirements available in the Application Processor (AP) 56.

When a Low Battery condition is detected the system, either dynamically or through user prompt, saves the current system state and context information from external DRAM to Flash NVM, Turns Off power to the external DRAM memory supply pins and performs a mode switch to execute the Low-Power XIP Application Kernel from Flash NVM utilizing the Internal Cache, 58 of the application processor, 56

Figure 3:
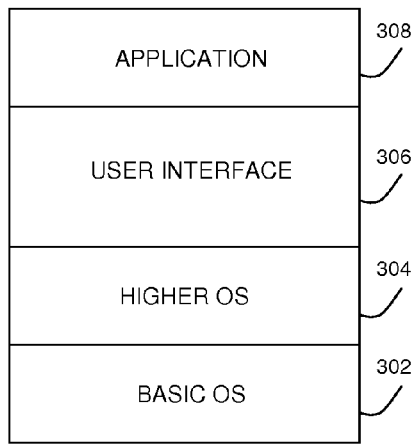
FIG. 3 is a flow chart of a method for Operating in Low-Power mode with Selection of Execute-in-Place Application Kernel running in Flash NVM in accordance with an embodiment of the present invention.
Figure 4:
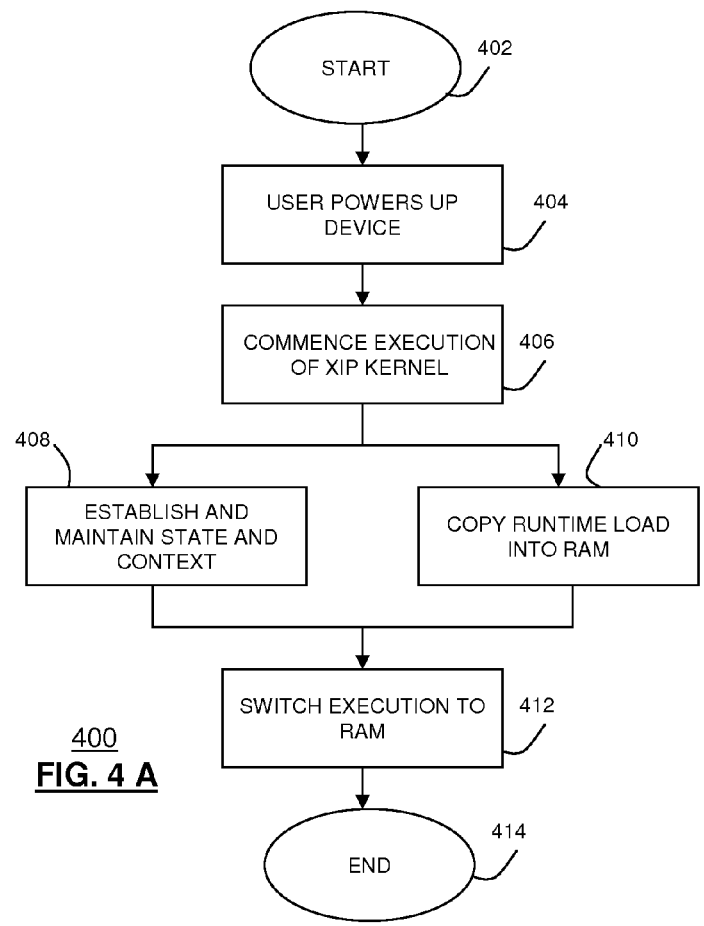

Referring to FIG. 3, a flow chart illustrating a method 70 of operating a handheld mobile electronic device having a processor, execute-in-place non-volatile memory (XIP NVM), and dynamic random access memory (DRAM), includes the steps 71 of detecting a low power mode for the handheld mobile electronic device, storing an application kernel in the XIP NVM at step 72, executing-in-place the application kernel from the XIP NVM upon detecting the low power mode at step 73, and duty cycling the DRAM to reduce current drain until the handheld mobile electronic device exits the low power mode at step 74. Detecting a low battery mode means detecting low battery or a different profile. The method 70 can further store a state and a context in either the XIP NVM or in an internal scratchpad memory internal to the processor that is shared between the XIP NVM and the DRAM at step 75. At step 76, the method can further learn or self-profile or use a user selected profile to determine when the DRAM can be turned off and instead execute-in-place an application kernel from the XIP NVM. The method 70 can also dynamically switch at step 77 to the XIP NVM from the DRAM when the handheld electronic device is in a hibernate mode or an application has idled for more than a predetermined amount of time.

The present invention discloses a solution for the problem of power consumption associated with the use of a DRAM for scratchpad and execution memory in portable computing device. More specifically, the invention duplicates essential code being executed in DRAM in a low power memory. The amount of essential code is smaller than in the full code instantiation in the DRAM. Under certain pre-defined circumstances, the device switches from executing code in the DAM to executing code in the low power memory, allowing the device to power off the DRAM. The reduced code instantiation contains operating system, user interface, and application elements such that the user interface will remain substantially unchanged while executing the reduced code, and applications in progress will continue to function substantially the same as well. The DRAM remains off until there is an indication that additional code not available in the low power memory is needed, at which time the device powers up the DRAM, re-loads the full code instantiation, and switches execution back to the DRAM.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" "device" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring now to FIG. 1B, there is shown a block schematic diagram of a computer architecture 100 for a portable computer device, in accordance with an embodiment of the invention. A processor 102 is coupled to a common bus 104. A low power memory 106 and a dynamic random access memory (DRAM) 108 are further coupled to the common bus 104. The low power memory is used to operate the device in a low power mode, and may be, for example, a byte addressable flash memory, such as a NOR type flash memory. In one embodiment the low power memory 106 further provides bulk storage and is used to store boot code, operating system code, user interface code, application code, shared code, data, and other code elements which may be instantiated in the DRAM upon powering up the device.

Upon powering up the device, a full code instantiation 110 is established in the DRAM. The full code instantiation includes the necessary user interface and application elements that are intended to be present upon powering up the device for use by a user, as is accomplished by a conventional boot up process. Operating system elements may also be present in the full code instantiation, or may be executed from a non-volatile boot memory which may be the low power memory 106. State and context information 112 is established and maintained in the DRAM as well. The state and context information is produced while executing code and includes state variable, data variables, stacks, pointers, and so on, as is known. A reduced code instantiation 114 is maintained in the low power memory. If the low power memory is non-volatile memory, the reduced code instantiation will persist through power cycles, otherwise the reduced code instantiation may be generated while executing the full code instantiation in a background process and stored in the low power memory. The reduced code instantiation contains duplicate code of code in the full code instantiation, and may include duplicate operating system, as well as user interface and application code.

However, the reduced code instantiation does not contain a complete duplication of the full code instantiation. Instead, it contains a smaller code set, and includes, for example, essential operating system, user interface, and application code to operate in a low power mode when the DRAM is powered off.

In one embodiment, the reduced code instantiation is used as an initial boot kernel, which is "executed in place" in the low power NOR type flash memory. Using the reduced code instantiation upon start up allows immediate, although limited use of the device upon powering up the device. As the reduced code instantiation is executed, the full operating code is instantiated in the DRAM, and upon completion of the full code instantiation, execution switches to the DRAM. In one embodiment both the DRAM and low power memory may conform to the Joint Electron Devices Engineering Council (JEDEC) specification referred to as LP DDR2, which allows a clock speed of up to 533 MHz and an operating voltage of 1.2 volts. Accordingly, the processor 102 and common bus 104 are configured to operate at the same clock speed and operating voltage as the DRAM memory.

In an alternate embodiment, the low power memory 106 may be used exclusively for bulk storage, and a second memory 116 may be used to instantiate the reduced code instantiation. The second memory 116 may be a NOR type flash, or a static RAM. Since the size of the reduced code instantiation is smaller than the full code instantiation, using a SRAM with a smaller memory size than the DRAM may be desirable in some designs.

Once booted and operating normally, while executing code from the full code instantiation 110, the device may experience a low power opportunity condition. For example, the device may be in an idle condition, without user input, for a period of time. Another low power opportunity condition may be a low battery condition. The device may switch execution to the reduced code instantiation when the battery charge level drops to a predefined level, and execution from the reduced code instantiation maybe used to extend operating time of the device at the expense of full operation. Another example of a low power opportunity condition is when the device commences a mode of an application which indicates the user will not change modes for some time, such as occurs if the device is a cellular phone, and the user commences a phone call mode.

While commencing the phone call a calling application is executed. Typically the user does not initiate other applications. The code being executed may be substantially mirrored in the reduced code instantiation 114. Once the condition is detected, the device may copy the relevant state and context information to an alternate memory, such as, for example, and processor cache 115. The state and context information that is copied is the information corresponding to the code in the reduced code instantiation. Other state and context information may be ignored. Using the relevant state and context information provides continuity of execution from the full code to the reduced code.

To facilitate switching execution from the DRAM to the low power memory, the operating system may maintain pointer stacks for each memory. Upon switching, the executed code uses the pointer stack associated with the memory being executed. The state and context information may be vectored to the reduced code instantiation as well. Preferably the user interface appears the same as when the full code instantiation is executed, although higher level features which may not be available may be grayed out in the user interface when executing from the reduced code instantiation.

Once execution from the reduced code instantiation commences, the DRAM may be shut down to reduce power consumption.

While executing from the reduced code instantiation, the user may wish to use additional functions, user interface elements, or applications not supported by the reduced code instantiation. When that happens, the DRAM is powered on, and the operating system executed by the reduced code instantiation begins re-instantiating the full operating code in the DRAM while execution continues from the reduced code instantiation. Upon completing the full code instantiation, including code for the requested user interface elements or applications, execution is switched back to the DRAM, and execution of the full operating code commences.

It is further contemplated that the reduced code instantiation may be used for an "emergency" type operation, where continuity of execution is not critical, but, for example, conserving power is critical. For example, in the case of the device being a "smart" phone, with the ability to operate a sophisticated operating system and execute various application programs, to conserve power the user may wish to have the device configured to operate as a simple cellular phone, shutting off all unnecessary sub-systems. In such an example, the reduced code instantiation would provide code to operate the device as a cellular phone only, allowing the DRAM and other components to be powered off. The state and context information in such an example is not critical, and it would not be necessary to preserve such information in such a case.

The device 100 may be any one of a variety of portable computing devices, including personal digital assistants, cellular phones including so called "smart" phones, palm top computers, and on. The exemplary embodiment illustrated in FIG. 1B is that of a communication device, such as cellular phone. Accordingly, the device includes a communication transceiver 118, and an audio processor 120. The communications transceiver includes the necessary baseband processor, modulator and demodulator, amplifier, filters, and antenna to communicate over cellular communication networks. Acoustic signals from, for example, the voice of a user of the device are received at a microphone 122 and converted to a digital audio signal, which may be passed to the communication transceiver for transmission. Similarly, modulated audio signals received by the communication transceiver may be demodulated, and passed to the audio processor, which converts them to analog form to be played over a speaker 124, such as an earpiece speaker.

To facilitate operation of the device, input/output elements such as a graphical display 126 and a keypad 128 and other buttons may be provided. The graphical display present information to the user in visual form, and the keypad allows the user to information into the device, as well as select options presented on the graphical display, as is known.

In the present embodiment, it is expected that user of the device may desire to make a phone call upon powering up the device. Accordingly, one application that will be included in the reduced code instantiation is a calling application which allows the user make and receive phone calls. Since the application is included in the reduced code instantiation, the user will be able to use the device for calling while the device is operating in the low power mode with the DRAM shut off. The calling application may include access to a phone book or contact list, speed calling, as well as the basic support for carrying out calling activity.

It is further contemplated that the device may include a local or personal area network transceiver 130. The transceiver 130 may be used for a variety of applications, including connecting to data networks, wireless accessories, and so on. Voice calling over data networks may be supported using the transceiver 130.

Referring now to FIG. 2B, there is shown a memory diagram of a full code instantiation 110, and a reduced code instantiation 114, in accordance with an embodiment of the invention. The full code instantiation 110 may include an operating system segment comprised of a basic operating system segment 202 and higher operating system segment 204. It is contemplated, however, that operating system code may be executed from another location, such as a boot up execute in place kernel in a non-volatile memory. The full code instantiation includes a user interface segment 206 and an application segment 208. The basic OS segment includes code for establishing, for example, a timing system, basic input and output operation, pointer stack maintenance, and so on. Higher OS code provides, for example, higher level operating system support, communication with other components of the device, as well as the code for maintaining state and context information, and code or switching execution to the low power memory at the appropriate time. The user interface segment includes all user interface elements necessary for presenting the user with a functioning interface, including graphical elements for a graphical user interface, and menuing functions. The application code segment includes any applications configured to run upon booting up the device, as well as any applications the user has requested to have loaded and run after booting up the device.

The reduced code instantiation 114 in one embodiment duplicates some of the code in the full code instantiation, allowing essential operations and features to be performed. The essential operations duplicated in the reduced code instantiation are a matter of engineering choice. The reduced code instantiation includes an operating system segment 210, a user interface segment 212, and an application segment 214. The user interface segment preferably includes user interface elements to substantially duplicate the user interface presented by the full code instantiation, with the exception that some functions may not be available. Those options which are not available in the user interface mirror may be shown, but grayed out, for example. The application segment 214 includes code for application programs which are commonly used, or necessary for basic operation. So, whereas the full code instantiation may have, for example, 10 applications loaded, the application segment of the reduced code instantiation may have only 2-3 applications. The application code in the application segment may be optimized versions of applications to reduce the memory footprint by removing some functions of the application. As with non-functional user interface elements, non-functional features of applications may be shown, but not active, and grayed out. It is contemplated that the user may select applications to be included in the application segment. The user may have certain favorite applications, such as, for example, an email application. Thus at least one of the applications in the reduced code instantiation may have been selected by the user.

FIG. 3B shows a profile or tracking table 300 for use in determining when to switch execution from the DRAM to the low power memory, in accordance with an embodiment of the invention. The table is an abstraction of events which may be used to trigger the change of execution from the DRAM to execution of the reduced code instantiation in the low power memory. For example, a condition 302 may be identified, such as a particular application being executed. A memory location 304 may be identified indicating a particular mode of an application is active. Furthermore, there may be a pre-selected time period 306 that must pass indicating the user will likely remain in the mode for some time.

Other low power opportunity conditions may be defined which are not related to operation or execution of an application, such as a low battery indication 308. The user may select, as an option, to use the reduced code instantiation of the reduced code instantiation upon the battery level dropping to a pre-selected level in order to conserve battery life. Additionally, the occurrence of a standby or idle mode 310 may be used to trigger the shutdown of the DRAM and commence execution from the reduced code instantiation. The profile 300 may be set by the manufacturer of the device, or it may be user-configurable, or it may be learned by tracking usage of the device to identify application usage patterns which lend themselves to low power operation.

FIG. 4B is a flow chart diagram of a method 400 of switching execution from a DRAM to a low power memory to reduce operating power consumption, in accordance with an embodiment of the invention. At the start 402, the device is powered on, and booted up. Execution of the full code instantiation in the DRAM is then commenced (404). While operating from the DRAM, a low power opportunity condition is detected (406). The low power opportunity condition may be the occurrence of the execution of a particular application, which has been pre-defined, or a mode of an application, such as commencing a phone call using a calling application. It may also be an indication from the user of the device to enter the low power mode. Other conditions may be used to trigger the low power mode, including the occurrence of a low battery condition, or an idle condition. Once the decision to commence the low power mode is made, the device may copy the relevant state and context information to an alternate memory (408). The alternate memory may be, for example, a processor cache. The device then switches execution from the DRAM to the alternate memory. Preferably the reduced code instantiation is instantiated in the alternate memory prior to commencing the method 400. If the reduced code instantiation is an execute in place kernel used to boot the device, the reduced code instantiation will be ready for immediate execution. Any state and context information copied to the alternate memory may then be used by the reduced code instantiation for continuity of execution. Once execution from the reduced code instantiation commences, the DRAM can be shut down (412), and the device is then operating an active low power mode. The active low power mode allows use of the device, but conserves power by virtue of having the DRAM shut off.

While in the active low power mode, the operating system, as instantiated in the low power memory, continues to check if the active low power mode is no longer appropriate (414). As long as conditions remain amenable to the active low power mode operation the device will remain in the active low power mode. When the device needs to perform tasks or applications not supported by the reduced code instantiation, or when the conditions otherwise change allowing full operating code execution, such as if the battery becomes charged back up to a sufficient charge level, the DRAM may be powered up (416) in preparation to re-insatiate the full operating code (418). Re-instantiating the full operating code is similar to a boot up process where a binary kernel may be decompressed from a non-volatile memory, which may be the low power memory storing the reduced code instantiation, and loaded into the DRAM, along with user interface code and appropriate application code. However, unlike a conventional boot process, where the device is not functional during the boot up process, the device continues executing from the reduced code instantiation, allowing use and functionality of the device, albeit limited functionality. The state and context information is copied into the DRAM as well (420) to facilitate continuity of execution. Once the full operating code is instantiated in the DRAM, the device switches execution to the DRAM, allowing full functionality of the device, including the ability to load and run additional applications not supported by the reduced code instantiation. The method then terminates (424) for the purpose of the example, however those skilled in the art will recognize that the method may be repeated for a variety of conditions and circumstances.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In summary, a handheld electronic device can use a User Selectable or Dynamic Switch to execute-in-place an application kernel for low-power with a DRAM turn-off. The Main Code State and Context from External DRAM Main Memory can be transfer to Internal Processor Memory (or to the NVM). The Main Code State and Context can be compressed before storing it in Internal Processor Memory or NVM and decompressed before restoring to DRAM as shown at step 78. The system can use Learning based and/or Static Profile for determining when to turn off external DRAM and switch to Kernel XIP mode. The system can further use software based Memory Management of Scratchpad Internal Processor Memory by the Kernel and can dynamically scale Internal memory Cache size and reduce Processor speed for increasing Scratchpad memory and lowering power consumption in Kernel XIP mode as illustrated at step 79. Assuming sufficient Scratchpad memory or cache memory is embedded and available on an application processor, memory management software can dynamically scale such internal memory with interplay with NVM to achieve desired results that can either increase Scratchpad memory and/or lower power consumption as needed.

Embodiment 3: Method and System for Using Execute-In-Place Flash NVM for Providing a High Security Device Architecture.

Accessible DRAM memories are subject to tampering, particularly when sensitive information is shadowed or copied among several memory devices in an embedded system. With the advent of Flash NVM, additional methods and architectures can be created to enhance and provide greater security for sensitive code. More particularly, embodiments herein can provide a Trusted Boot and an Original Design Manufacturer (ODM) Secure Partition using a Flash NVM execute-in-place architecture to provide a higher level of security for Crytographic Processing, storage and management of sensitive data and for credentialing data than DRAM based architectures.

The embodiments herein provides a Trusted Boot and an ODM Secure Partition using Flash NVM execute-in-place to provide a higher level of security for Crytographic Processing, Storage and Management of sensitive data and credentials than DRAM based architectures. The Trusted Boot can be pre-flashed into the Flash NVM and in order to prevent replacement with rogue software, the Application Processor can be wired to prevent peripheral boot. Early in the boot process, the range-locking feature of the Flash NVM can be used to write/erase protect the blocks containing the Trusted Boot, and the lock-tight command is used to prevent additional lock/unlock commands. In order to validate the Initial Program Load, the Trusted Boot can verify the digital signature before proceeding with the execution of an Initial Program Load (IPL).

Figure 4:
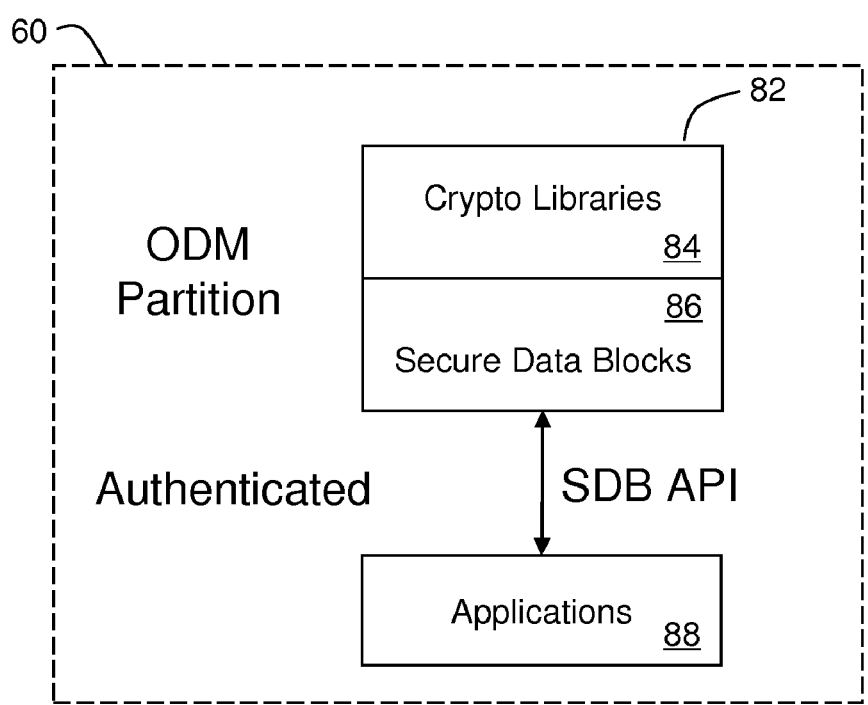
FIG. 4 is an illustration of a highly secure memory architecture in accordance with an embodiment of the present invention.

Referring to the memory architecture 80 of FIG. 4, an ODM Secure Partition 82 in the Flash NVM can be created for the Platform Crypto Library 84 that is capable of handling the processing needs required to support Public Key Infrastructure (PKI). Along with Hash, Signing and Encryption, the Crypto Library also offers a software alternative to One Time Programming for storing credentials and provisioning information or other sensitive information such as IMEI, MAC addresses, etc. Information that needs to be protected, such as a passcode hash, MAC addresses etc, are stored in a Secure Data Block 86 in the ODM Secure Partition 82.

The Platform Crypto Library 84 will use the ODM Secure Partition 82 in Flash NVM to store Secure Data Blocks 86 and the design ensures that the data is protected against tampering. The data is available to applications 88 via a Secure Data Block API (SDBAPI). The SDBAPI functions are called with a CRYPTPROTECT_SYSTEM flag and can consist of at least two functions: CryptProtectData and CryptUnprotectData using the Master Key which is also stored in the ODM Partition. This prevents unprivileged applications from accessing the data.

Figure 5:
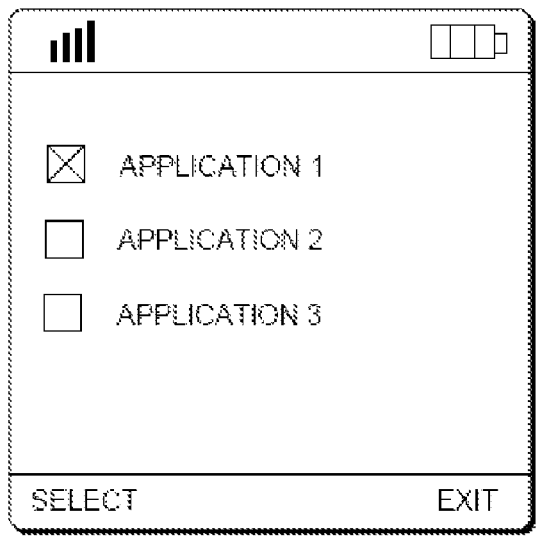
FIG. 5 is a flow chart of a method of providing a high security device architecture using XIP Flash NVM in accordance with an embodiment of the present invention.
Figure 6:
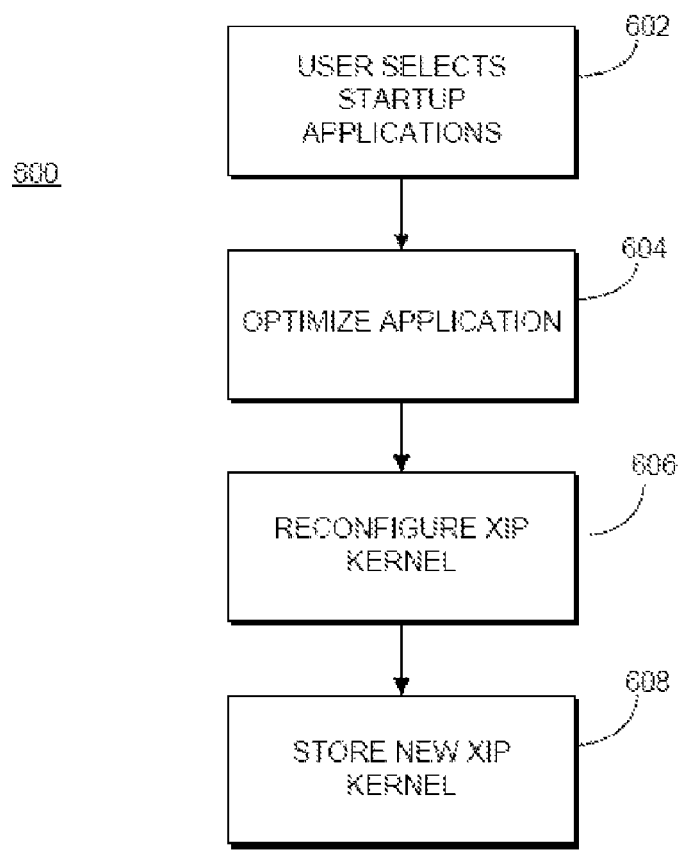
FIG. 6 illustrates a method and system of providing virus protection on mobile device in accordance with an embodiment of the present invention.
Figure 6:
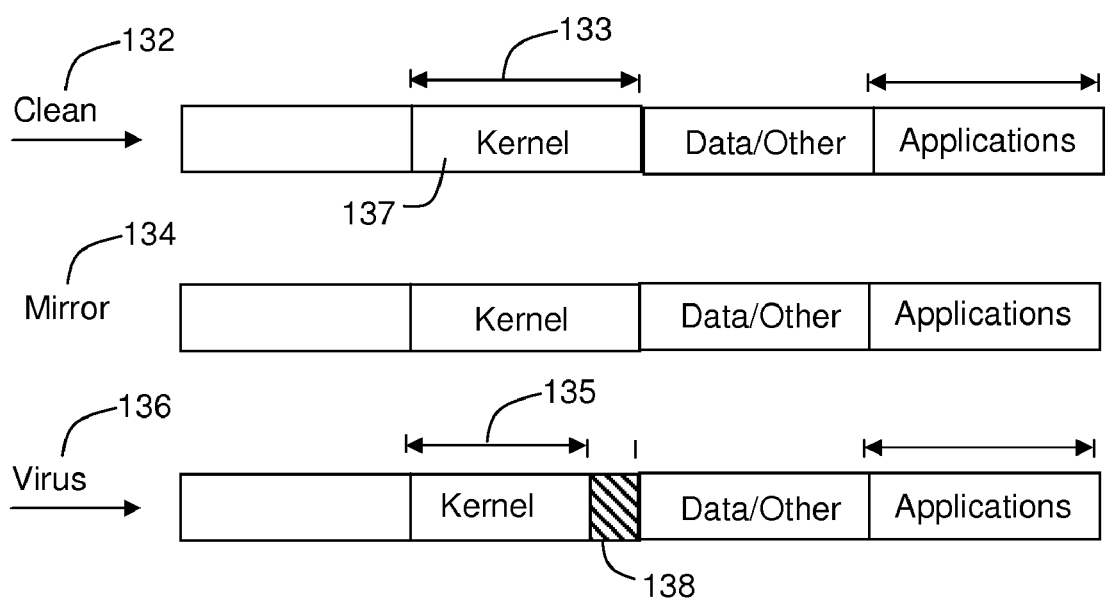

Referring to FIG. 5, a flow chart illustrating a method 90 of using execute-in-place non-volatile memory (XIP NVM) for providing a high security electronic device architecture can include the forming a secure partition of memory within the XIP NVM at step 91 and loading IPL within the secure partition wherein the IPL provides a Trusted Boot program at step 92. The method can further store sensitive data and credentialing data in the secure partition at step 93. At step 94, the method can use the secure partition in the XIP NVM for cryptographic processing and storage and management of sensitive data and credentials. At step 95, the method can pre-flash the XIP NVM with the Trusted Boot program. An Application Processor can be wired to prevent replacement of the Trusted Boot program with rogue software at step 96. The method can use a range-locking mechanism of the XIP NVM to write/erase protect blocks containing the Trusted Boot program and can additional use a lock-tight command to prevent additional lock/unlock command functions as illustrated at step 97. The method can further verify a digital signature during the execution of the Trusted Boot program to validate an Initial Program Load (IPL) before execution of the IPL at step 98. The method at step 99 can also form a platform crypto library that supports public key infrastructure (PKI) and store Secure Data Blocks wherein data is available to application via a Secure Data Block Application Program Interface (SDBAPI).

In summary, embodiments herein provide device security using a Flash NVM memory architecture. For example, Trusted Boot using Flash NVM XIP with pre-flash tool; Flash NVM Range locking mechanism for write/erase to prevent tampering; Digital Signature XIP verification in Flash prior to loading binary image; ODM Secure Partition with Crypto Library XIP and Secure Data Blocks for storage of sensitive material; Crypto Library can access on operate on Secure Data Blocks using a defined SDB-API; Applications can access the ODM Secure Partition using a defined OSP-API; Applications must Authenticate with the ODM Secure Partition before they can use the OSP-API; Each Secure Data Block can establish independent Authentication and Keying Material for the Applications. This XIP Flash NVM memory provides a high security architecture where a Trusted boot uses XIP from LP-DDR2 NVM. This architecture provides strong protection against replacing a Bootloader without Boot time compromise. As stated above, the Trusted Boot can be pre-flashed into the NVM & protected by locked-in feature. Digital Signature can be verified by Trusted Boot to validate initial program load and ODM secure partitioning can be created with Crypto Library XIP & Secure Data Blocks for storage of sensitive materials. Further, protection of Private Key can use Proprietary Methods for Obscuring Private Data. The Crypto Library offers a software alternative to over-the-air programming for storing credentials and provisioning information that needs to be protected against tampering. This architecture also provides improved protection against OS and Application Tampering. The architecture is also much more difficult to clone, to remove subsidy locks or to compromise the device.

Embodiment 4: Software Virus Filter Algorithm for Multi-Media Cellular Phone or Electronic Device.

Today virus protection on a mobile phone is typically provided by the wireless carrier's network system. There isn't a system that would allow virus protection on newly installed application on smartphones. As the industry moves toward integration of more content and applications, there is a need to minimize the chances of getting viruses on a mobile phone Referring to FIGS. 2 and 6, a method and system of virus protection for a mobile electronic device having execute-in-place non-volatile memory (XIP NVM) 60 can include storing "clean" code 132 including an application kernel 137 in the XIP NVM in a storage location of a predefined size 133 for the application kernel and creating a mirror 134 of code. The method can further include uploading information 136 to the XIP NVM 60 and comparing the storage location of the predefined size for the application kernel after uploading the information 133. If the predefined size (133) for the application kernel remains the same, then the method can execute-in-place the application kernel from the XIP NVM. If the predefined size for the application kernel has changed, then the mirror of the code is restored or reloaded. The algorithm detects the changes in the kernel and other memory space by comparing the memory size and addressing allocations between the clean kernel and new application requesting to be installed. If a protected area of the memory space is being altered, the algorithm will reject the new application installation. The corrupted application is then tagged with a unique identifier and sent to a server as a repository of corrupted applications. These tagged application are later to be used in the future for verification of the applications prior to being loaded the smartphone installation process. The use of the unique tag identifier can be used to minimize the wireless payload between the smartphone and the network. As in traditional wireless networks, the reduction or compression of data in wireless systems allow for more capacity and lower power drain on the smartphone. It can be assumed that the information 136 uploaded into the XIP NVM contains a virus 138 when the predefined size or memory addressing allocation for the application kernel has changed. For example, a comparison of the space or size for the original application kernel is 133 (representative of a predetermined number of bytes or addresses or some other measurement) while the size after uploading the information 136 is only 135 which is smaller than the original application kernel size. Note, the techniques are not just limited to an application kernel, but can be applied to any memory having a predefined memory allocation, particularly any predefined memory allocation area that should be given added protection such as an application kernel that includes boot code.

The method can further include quarantining the information uploaded into the XIP NVM assumed to contain the virus and/or deleting the information uploaded into the XIP NVM assumed to contain the virus. In yet another aspect, the method can further extract a tag from an application or file about to be downloaded to the mobile electronic device and launch a virus protection program which is synchronized with a remote virus server containing a database or repository of virus information. Such a method can further send the tag from the mobile electronic device to the virus server and compare the tag with information in a database or repository. The method can then execute the application at the mobile electronic device if no match for the tag is found at the database or repository or if the tag belongs to a non-viral set identified at the database or repository. The method can also avoid the execution of the application if a match for the tag is found at the database or depository that is indicative of a virus.

Another similar embodiment for virus protection for a mobile electronic device having execute-in-place non-volatile memory (XIP NVM) can include extracting a tag from an application or file about to be downloaded to the XIP NVM of the mobile electronic device and launching a virus protection program which is synchronized with a remote virus server containing a database or repository of virus information. In this manner, the application or file can be pre-scanned for a particular signature indicative of a virus (or alternatively of a safe application or file). The method can further send the tag from the mobile electronic device to the virus server and compare the tag with information in the database or repository. In one embodiment, a "good tag" can be sent back if no match indicative of a virus is found. In any event, the method can then execute the application at the mobile electronic device if no match for the tag is found at the database or repository if the tag belongs to a non-viral set identified at the database or repository and can also avoid the execution of the application if a match for the tag is found at the database or depository that is indicative of a virus.

Embodiments herein provide a means to scan for viruses when a software application is downloaded to a mobile phone. The use of this service will minimize viruses on smartphones. The amount of mobile applications used on mobile devices continues to increase in the industry. Today, virus protection on mobile phones is limited by the protection a wireless carrier provides via the network. The embodiments herein describe a method in which software applications for mobile phone are scanned for viruses in various ways that do not necessarily require the transmission of information back to a server although other embodiments do include exchanging information with a virus server. The various embodiments describe a system methodology of scanning, detecting, and/or reporting (among other functions) of potential viruses on or in software intended to be download into the mobile phone. The embodiments herein can leverage the advancement of speed, power drain and storage size of LP-DDR2 memory devices in a mobile phone.

As discussed above, some of the methods herein can work in conjunction with a remote "virus server". Before a new application is downloaded onto a mobile electronic device, the system can determine if the file about to be downloaded has been scanned and whether the mobile device has been synchronized to the virus server. The mobile device can include a small virus or security application or program that operates or coordinates with the virus server before a file is actually executed on the mobile electronic device. Among the operations performed, the virus protection scheme herein can extract a tag from the file to be downloaded to the mobile electronic device. The tag can be sent to the remote virus server which can contain an updated database or depository of virus information. If the extracted tag matches information stored at the virus server, the system can reject or quarantine the new application. If the extracted tag fails to match any virus information or confirms a virus free application, then the application can proceed to execute on the mobile electronic device.

Embodiment 5: Storage Algorithm for Multimedia Mobile Device

The embodiments herein can provide a way to use LP-DDR2 Non-Volatile Memory to store user related data with faster access. The amount of memory storage required in Mobile Devices continues to get larger due to the increase in complexity of multimedia applications such as videos, games, and sophisticated camera features and high resolution images. Thus, faster access of personal multimedia data from embedded storage is desired. Faster access correlates to a good user experience.

Today's designers use eMMC, or an embedded Multimedia Memory Card (or EMMC for external multimedia memory card), for mass storage of their personal data derived from the multimedia applications. The eMMC architecture is composed of the MMC standard interface, NAND Flash memory and a host controller. The eMMC 65 can be seen in FIG. 2 as used with a host controller or application processor 56. The NAND Flash memory of the eMMC is typically cheap bulk memory which will be significantly slower than LP-DDR2 Non-Volatile Memory.

The advent of the LP-DDR2 Non-Volatile Memory (NVM) with execute-in-place capability, faster speeds, multi-bit storage per transistor, and finer geometries can enable the additional capacity for multimedia personal data more efficiently than eMMC as contemplated by the embodiments herein. The storage algorithm described herein keeps the complexity hidden from programmers and the application.

Figure 7:
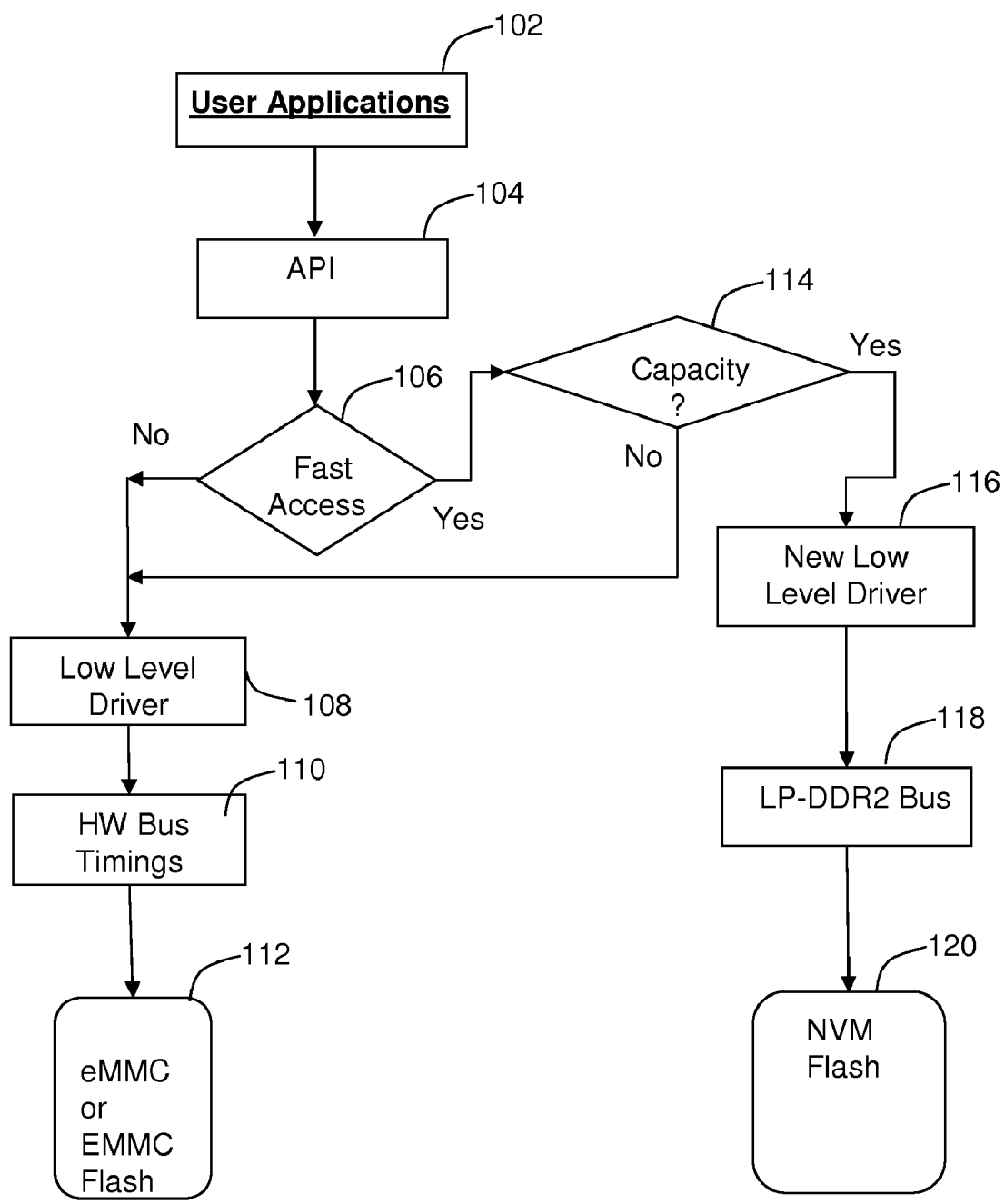
FIG. 7 is a flow chart of a method of storage algorithm for a multimedia mobile device using XIP Flash NVM in accordance with an embodiment of the present invention.

Referring to method and system 100 of FIG. 7, the Flash Application interface 104 provides support for the different Flash Devices and it typically consist of an API 104 that supports the particular interface of functions and operations of a user application 102. The API communicates with the low level drivers and the corresponding Hardware specific bus timings/operations. The low level code takes care of issuing the correct sequence of write operations for each command and of interpreting the information received from the device during programming or erase.

The storage algorithm as illustrated in FIG. 7 attempts to select the LP-DDR2 NVM at decision step 106 when faster data needs to be accessed and selects the standard eMMC otherwise. The algorithm 100 further determines if the NVM has sufficient capacity for running the desired user application at decision block 114. If insufficient capacity exists, then the eMMC or EMMC Flash memory is used at 112 after the low level drivers 108 and the corresponding Hardware specific bus timings/operations 110 are set for the eMMC or EMMC Flash memory. If the NVM has sufficient capacity, the low level drivers 116 using the LP-DDR2 Bus 118 is used to provide fast access via the NVM Flash memory 120. Further note that read/write functions on the LP-DDR2 Bus is also faster than the corresponding bus for eMMC or EMMC.

If the storage required can be obtained with the additional capacity of the LP-DDR2 NVM then the eMMC can be omitted for a cost reduction on the Bill of Materials (BOM). Thus, embodiments herein reduces the time that the user can access his or her personal data and can potentially reduce the cost of the device by eliminating the eMMC completely. Even if the eMMC or the EMMC is not eliminated, use of the NVM can improve the user experience by utilizing the NVM for multimedia functions or other functions that are performed most frequently and synchronizing the data in the NVM with the eMMC or EMMC storage. By essentially shadowing code and data that is used most frequently in NVM from the eMMC or EMMC, the XIP nature of the NVM will enhance the user experience by generally providing faster performance or access to applications that may have been for example temporarily placed in a holding pattern due to low battery modes, sleep or hibernation modes, or other application priorities.

Further note that "fast access" can be determined from a user interface experience perspective. More particularly, fast access can be determined from a user interface experience perspective that enables access to an application within a predetermined time period of launch of such application such that the user fails to perceive a delay in the launch of such application. Typically, such delay can be less than two seconds or less than one second. Delay of more than two seconds is perceptible and even annoying to some users.

Referring again to FIG. 2, a system 50 of using execute-in-place non-volatile memory (XIP NVM) 60 in a mobile electronic device can include a bus 51 communicating information between an application processor 56 and the XIP NVM 60 where the bus 51 bus operates at 1.5 volts or less (typically 1.2 volts or less for LP DDR2 XIP NVM) and a system clock for the application processor operating at or above 200 MegaHertz. The application processor 56 can be coupled to XIP NVM 60 and be programmed to determine if a desired application can use fast access processing enabled by the XIP NVM based on available resources from the XIP NVM, use an embedded Multimedia Memory Card (eMMC) 65 or an external Multimedia Memory Card (EMMC) 67 if no fast access is determined, and use the XIP NVM 60 if fast access processing is determined. Fast access processing may be determined from profiling of the user applications.

Figure 8:
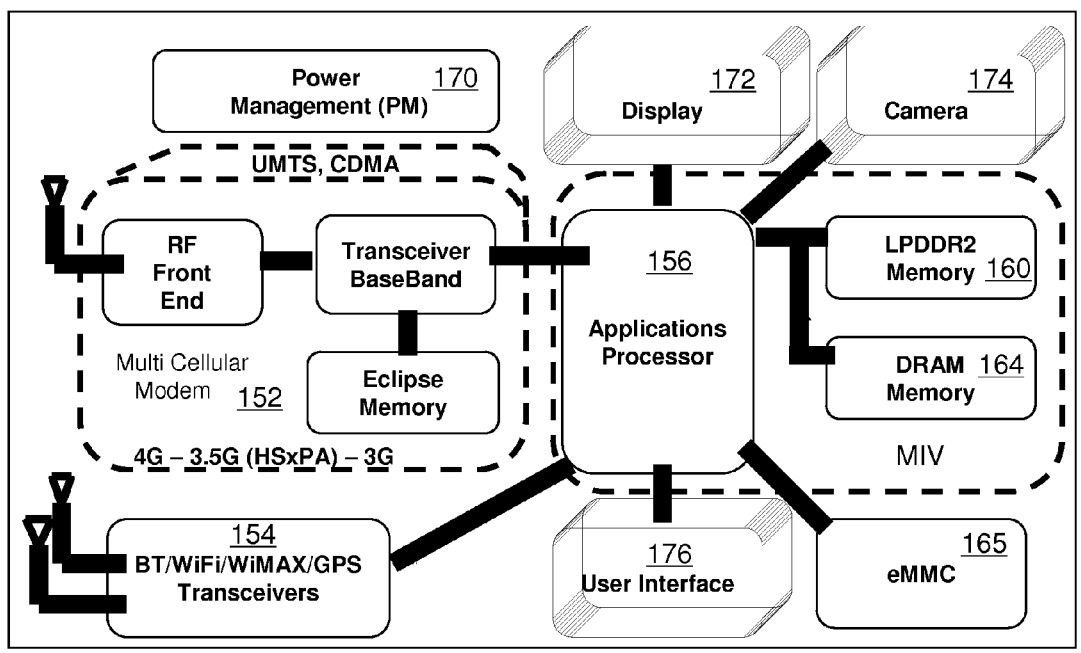
FIG. 8 is another illustration of a multimedia system having embedded memory and operating in accordance with an embodiment of the present invention.

Referring to FIG. 8, a system embedded system 150 similar to the embedded system of FIG. 2 is shown and can include a processor or controller 156 for the embedded system, a non-volatile memory (NVM) 160 capable of executing in place and coupled to the controller 156, a dynamic random access memory (DRAM) 164 coupled to the controller where the NVM 160 and the DRAM 164 share a bus. The system can essentially otherwise similarly operate in a manner as previously described above with respect to the various methods previously described. The system 150 can be any number of handheld or mobile wireless devices such as a laptop computer, a smartphone, a PDA or any number of other handheld devices. In the case of a smartphone for example, the system 50 can further include a transceiver or RF module 152 and can optionally include a connectivity module 154 which can communication with other system using any number of wired or wireless protocols (such as Bluetooth or WiFi). The RF module 152 can include an RF Front end, a transceiver baseband module and Eclipse Memory for example. The processor or controller 156 can include on-board memory such as cache memory that can be used for scratchpad memory or for other purposes as previously described. The system 150 can optionally include an embedded multimedia card (eMMC) 165 that can have any number of applications and/or data files. As noted above, the eMMC 165 can generally serve as mass storage for multimedia applications and/or files. In yet another embodiment, the eMMC 165 can be eliminated and replaced with a partitioned portion of the NVM XIP memory 160. In addition, a device such as smartphone can include other peripheral devices and modules such as a display 172, camera 174 and user interfaces 176. In addition, the device can further include a power management module 170. In yet another aspect herein, the processor 156 can recognize the executable files within the eMMC 165 and/or EMMC 167 and place them on the NVM 160 to further enhance the launch of one or more applications to also provide an enhanced user experience.

Embodiment #6. Method and System for Reducing Power Consumption in Mobile Electronic Devices Using Execute-In-Place Non-Volatile Memory Using LP DDR2 NVM memory facilitates several functions not previously contemplated with other memory technologies, particularly in the context of embedded memories in mobile electronic devices such as cellular phones. The higher performance in terms of bus speeds and voltages can facilitate dynamic frequency shifting and dynamic voltage shifting and generally provide a better user experience using the techniques described herein. LP DDR2 NVM can have 2.4 to 3.2× faster bus speeds than DDR1 Technology at 400 MHz-533 MHz. LPDDR 2 NVM memory along with the techniques described herein can provide better boot performance and optimal memory usage, reduce the number of page faults, provide faster access to unpaged code, provide better paging performance for Demand Paged code, and provide Instant Boot and Fast Application Switching.

Smartphones today can take 10-30 seconds to Boot-up depending on code size, but using the techniques described and claimed herein, a smartphone can provide for an "Instant" boot by executing kernel binary image of the application GUI code out of LP-DDR2 NVM while the main binary image is copied into DRAM as a background process. Multimedia Performance is also improved with faster bus speed and faster storage/access algorithms for multimedia applications. As described with embodiment 5 above, an algorithm can select LP-DDR2 NVM when a user experience is jeopardized instead of eMMC (embedded Multi-Media Card).

Furthermore, using LPDDR2 NVM and the techniques and architectures described herein, handheld electronic devices can achieve longer battery life using for example, reduced I/O operating voltage down to 1.2V with an approximately 47% reduced Interface pin count in comparison to other DDR1 technology. Such arrangements can yield power savings of approximately 40% of CPU Memory Interface based on the following calculation:

$$\text{Power is proportional to } Freq. \times (\text{Voltage})^2 \times \text{Capacitance}$$

$$\text{Power Ratio} = \frac{DDR1}{DDR2} = \frac{133 \text{ MHz} \times (1.8)^2 \times C}{400 \text{ MHz} \times (1.2)^2 \times (1 - .47)C} = 1.41$$

Dynamic switching to kernel XIP when Smartphone functionality does not need DRAM, can facilitate turning the DRAM off and reducing processor speed. Thus, in situations where relatively low power or processing is desired such as during a phone call or during text messaging or during standby mode, the DRAM can be turned off or powered down and enable additional power savings of approximately 21%. Further note that reducing the processor speed can provide as much as 20% savings as well. Thus, applications can be profiled to determine which applications can operate with lower processor speeds without jeopardizing the overall user experience (e.g., Video Playback).

Given that the application processor or CPU and memories account for approximately 38% of the power consumption in a typical Smartphone, these tactics can improve battery life of a 1250 mAh device by 2 hours for a total of 8 hours which yields approximately 30% Longer Battery Life. Additionally similar techniques applied to Baseband transceiver modules or other processors having similar memory arrangements can yield even greater battery life estimates that can probably exceed 50%.

Figure 9:
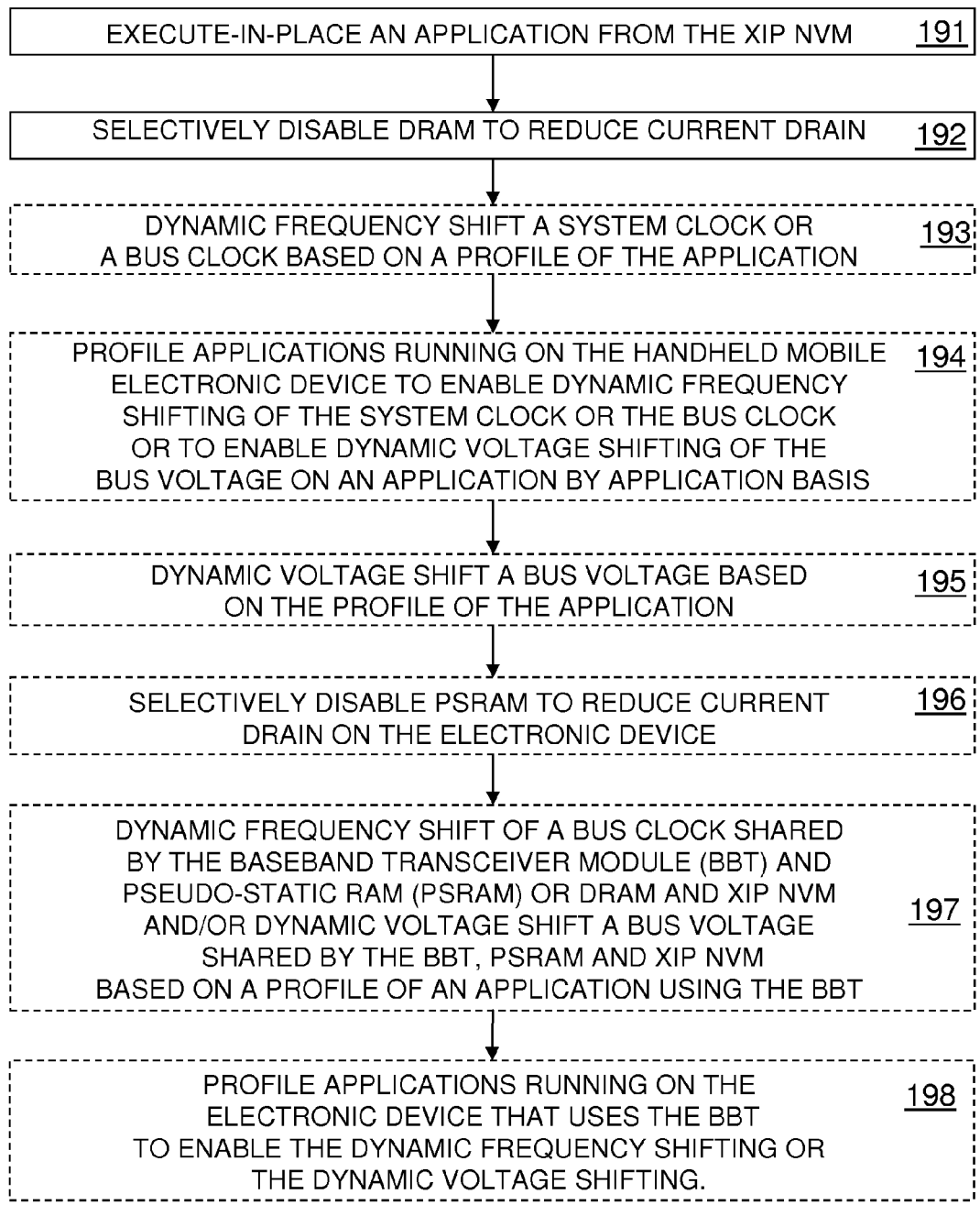
FIG. 9 is a flow chart of a method of reducing power consumption in mobile electronic devices using XIP NVM in accordance with an embodiment of the present invention.
Figure 10:
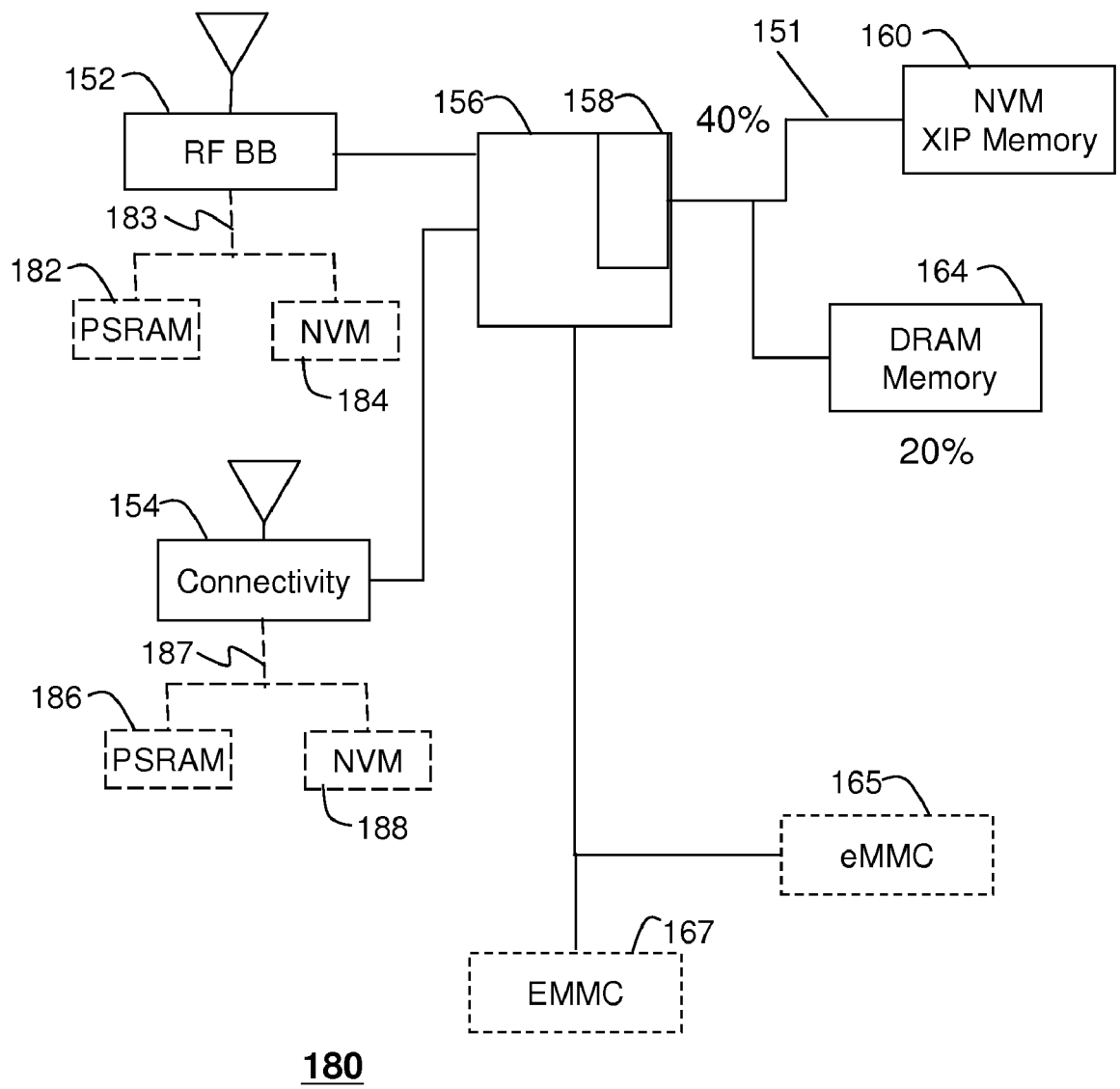
FIG. 10 is a system of reducing power consumption in mobile electronic devices using XIP NVM in accordance with an embodiment of the present invention.

Referring to FIGS. 9 and 10, a method 190 and system 180 for power management for a handheld mobile electronic device having a processor 156, execute-in-place non-volatile memory (XIP NVM) 160, and dynamic random access memory (DRAM) 164 is shown. The method 190 can execute-in-place an application from the XIP NVM 160 at 191 and selectively disable the DRAM to reduce current drain on the handheld mobile electronic device at 192. The method can further reduce current drain at 193 by dynamic frequency shifting of a system clock or a bus clock based on a profile of the application on an application by application basis. For current drain attributable to processing between an application processor (156) and memory, the use of LP DDR2 NVM memory can reduce such current drain by nearly 40% and the disabling of the DRAM can further reduce such current drain by another 20%. The dynamic frequency shifting (DFS) can also reduce current drain by approximately another 20%. Overall, such techniques can potentially provide 30% current drain reduction or more for a mobile electronic device.

The method 190 can further include the step 194 of profiling applications running on the handheld mobile electronic device to enable the dynamic frequency shifting of the system clock or the bus clock on a bus 151 on an application by application basis. The method can also dynamic voltage shift a bus voltage based on the profile of the application at 195.

Note the system 180 of FIG. 10 can be similarly configured to the system 50 of FIG. 2 or system 150 of FIG. 8. System 180 shares some of the same elements as the system 150 and similar numbering has been used to reflect such commonality. Note that the baseband transceiver module (BBT) 152 as well as the connectivity module 154 have an analogous memory arrangement to the memories 160 and 164 used in conjunction with the application processor 156. In one instance the BBT 152, pseudo-static RAM (PSRAM) 182 and XIP NVM 184 can be analogous to the processor 156, DRAM 164, and XIP NVM 160 respectively. In another instance, the connectivity module 154, pseudo-static RAM (PSRAM) 186 and XIP NVM 188 can be analogous to the processor 156, DRAM 164, and XIP NVM 160 respectively.

With this in mind, the method 190 can further include the selective disabling of the PSRAM 182 or 186 or both to further reduce current drain on the handheld mobile electronic device at 196. Analogously, the method at 197 can further dynamically frequency shift a bus clock and/or dynamically voltage shift a bus voltage shared by the baseband transceiver module 152 (or connectivity module 154) and pseudo-static RAM (PSRAM) 182 (or 186) and XIP NVM 184 (or NVM 188). At 198, the method can further profile applications running on the handheld mobile electronic device that uses the baseband transceiver module to enable the dynamic frequency shifting of the bus clock shared by the baseband transceiver module and pseudo-static RAM (PSRAM) and XIP NVM. Of course, the method can profile other applications that use other similarly arranged processors and memory configurations such as the connectivity module 154, PSRAM 186 and XIP NVM 188. In addition, busses 183 and 187 may be replaced with LPDDR2 interface for higher performance and even lower power, in this case the PSRAM would be replaced with a DRAM similar to 164 and bus 51.

A system 180 of power management for a handheld mobile electronic device can generally include execute-in-place non-volatile memory (XIP NVM), dynamic random access memory (DRAM) coupled to the XIP NVM, and a processor coupled to the XIP NVM and DRAM. The processor can operate to execute-in-place an application from the XIP NVM, selectively disable the DRAM to reduce current drain on the handheld mobile electronic device, and dynamically frequency shift a system clock or a bus clock based on a profile of the application. The processor can generally operate to perform the functions as described with respect to the method 190. For example, the processor can be further programmed to profile applications running on the handheld mobile electronic device to enable the dynamic frequency shifting of the system clock or the bus clock on an application by application basis. The processor can be further programmed to dynamically voltage shift a bus voltage based on the profile of the application. The processor can be further programmed to profile applications running on the handheld mobile electronic device to enable the dynamic voltage shifting of the bus voltage on an application by application basis.

As noted above, the handheld mobile device can further include a baseband transceiver module coupled to pseudo-static RAM (PSRAM) and XIP NVM, where the processor is further programmed to selectively disable the PSRAM to further reduce current drain on the handheld mobile electronic device. The processor can further be programmed to dynamically frequency shift a bus clock shared by the baseband transceiver module and pseudo-static RAM (PSRAM) and XIP NVM. The processor can be further programmed to profile applications running on the handheld mobile electronic device that uses the baseband transceiver module to enable the dynamic frequency shifting of the bus clock shared by the baseband transceiver module and pseudo-static RAM (PSRAM) and XIP NVM. The processor can be further programmed to dynamically voltage shift a bus voltage of a bus clock shared by the baseband transceiver module and pseudo-static RAM (PSRAM) and XIP NVM based on a profile of an application using the baseband transceiver module. Finally, the processor can be further programmed to selectively disable the PSRAM to reduce current drain on the handheld mobile electronic device.

Figure 11:
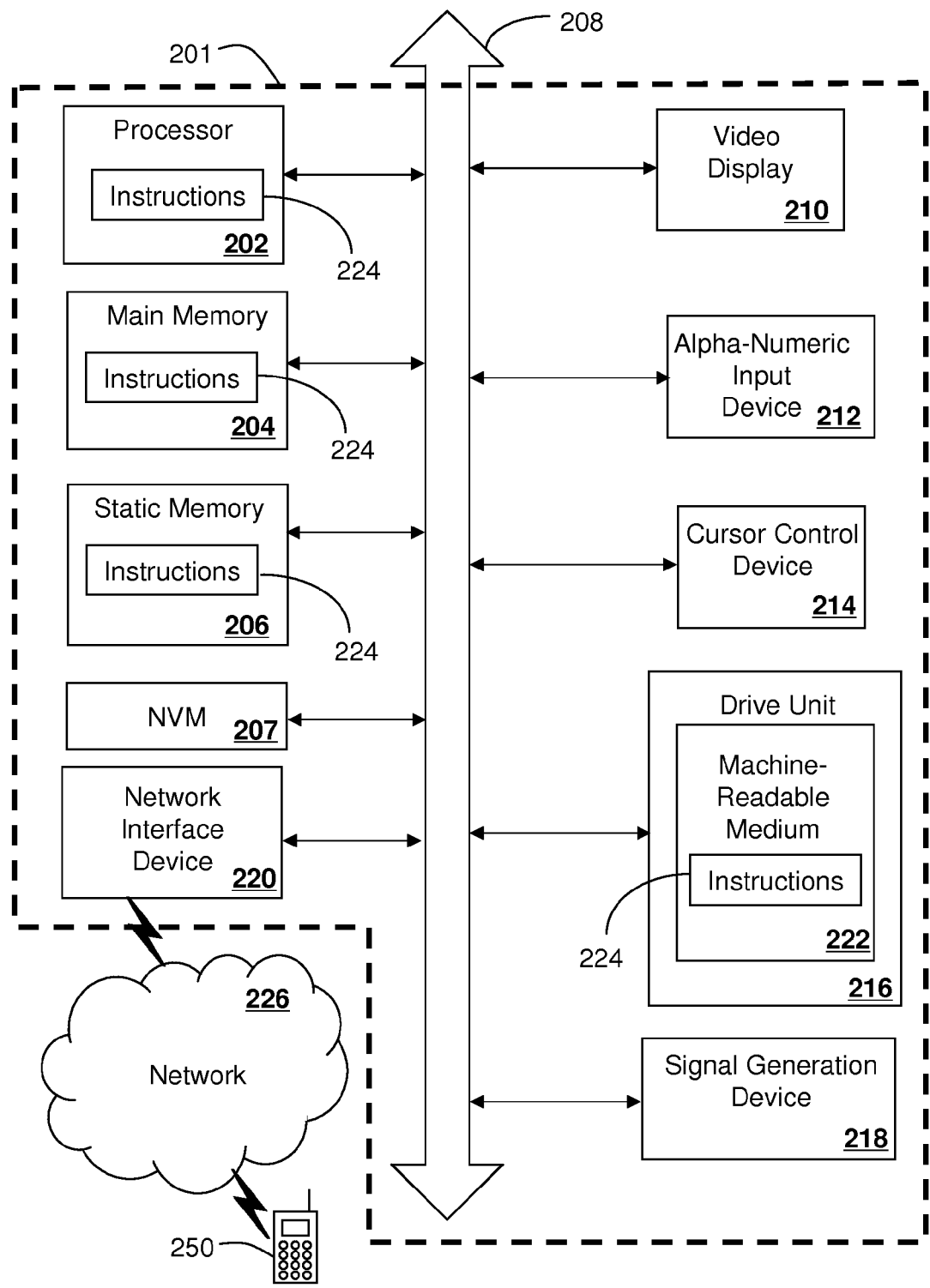
FIG. 11 is a computing device having a memory arrangement and operating in accordance with an embodiment of the present invention.

FIG. 11 depicts an exemplary diagrammatic representation of a machine in the form of a computer system 200 within which a set of instructions, when executed, may cause the machine to perform any one or more of the methodologies discussed above. In some or most embodiments herein, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. For example, the computer system can include a recipient device 201 and a sending device 250 or vice-versa.

The machine may comprise a server computer, a client user computer, a personal computer (PC), a tablet PC, personal digital assistant, a cellular phone, a laptop computer, a desktop computer, a control system, a network router, switch or bridge, or any machine capable of executing a set of instructions (sequential or otherwise) that specify actions to be taken by that machine, not to mention a mobile server. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 200 and more particularly the recipient device 201 can include a controller or processor 202 (e.g., a central processing unit (CPU), a graphics processing unit (GPU, or both), a main memory 204 and a static memory 206 such as DRAM, which communicate with each other via a bus 208. The computer system 200 would further include non-volatile XIP memory or NVM 207 as described in detail above. The computer system 200 may further include a presentation device such as a video display unit 210 (e.g., a liquid crystal display (LCD), a flat panel, a solid state display, or a cathode ray tube (CRT)). The computer system 200 may include an input device 212 (e.g., a keyboard), a cursor control device 214 (e.g., a mouse), a disk drive unit 216, a signal generation device 218 (e.g., a speaker or remote control that can also serve as a presentation device) and a network interface device 220. Of course, in the embodiments disclosed, many of these items are optional.

The disk drive unit 216 may include a machine-readable medium 222 on which is stored one or more sets of instructions (e.g., software 224) embodying any one or more of the methodologies or functions described herein, including those methods illustrated above. The instructions 224 may also reside, completely or at least partially, within the main memory 204, the static memory 206, the NVM 207, and/or within the processor 202 during execution thereof by the computer system 200. The main memory 204 and the processor 202 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but are not limited to, distributed processing or component/object distributed processing, parallel processing, or virtual machine processing can also be constructed to implement the methods described herein. Further note, implementations can also include neural network implementations, and ad hoc or mesh network implementations between communication devices.

The present disclosure contemplates a machine readable medium containing instructions 224, or that which receives and executes instructions 224 from a propagated signal so that a device connected to a network environment 226 can send or receive voice, video or data, and to communicate over the network 226 using the instructions 224. The instructions 224 may further be transmitted or received over a network 226 via the network interface device 220.

While the machine-readable medium 222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The terms "program," "software application," and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

In light of the foregoing description, it should be recognized that embodiments in accordance with the present invention can be realized in hardware, software, or a combination of hardware and software. A network or system according to the present invention can be realized in a centralized fashion in one computer system or processor, or in a distributed fashion where different elements are spread across several interconnected computer systems or processors (such as a microprocessor and a DSP). Any kind of computer system, or other apparatus adapted for carrying out the functions described herein, is suited. A typical combination of hardware and software could be a general purpose computer system with a computer program that, when being loaded and executed, controls the computer system such that it carries out the functions described herein.

In light of the foregoing description, it should also be recognized that embodiments in accordance with the present invention can be realized in numerous configurations contemplated to be within the scope and spirit of the claims. Additionally, the description above is intended by way of example only and is not intended to limit the present invention in any way, except as set forth in the following claims.

What is claimed is:

1. A method of power management for a handheld mobile electronic device having a processor, execute-in-place non-volatile memory (XIP NVM), and dynamic random access memory (DRAM), comprising the steps of:
   executing-in-place an application kernel from the XIP NVM, wherein the application kernel is a subset of a main application code;
   selectively disabling the DRAM to reduce current drain on the handheld mobile electronic device, wherein the application kernel from the XIP NVM maintains control of the system while a main application code loads to the DRAM in a background process;
   detect a low power mode for the handheld mobile electronic device;
   store the application kernel in the XIP NVM;
   executing-in-place the application kernel from the XIP NVM upon dectecting the low power mode;
   store and share a state and a context between the application kernel and the main application code in one of the XIP NVM or an internal memory of the processor that is shared between the XIP NVM and the DRAM; and
   dynamic frequency shifting of a system clock or a bus clock based on a profile of the application.

2. The method of claim 1, wherein the method further comprises the step of profiling applications running on the handheld mobile electronic device to enable the dynamic frequency shifting of the system clock or the bus clock on an application by application basis.

3. The method of claim 1, wherein the method further comprises the step of dynamic voltage shifting of a bus voltage based on the profile of the application.

4. The method of claim 3, wherein the method further comprises the step of profiling applications running on the handheld mobile electronic device to enable the dynamic voltage shifting of the bus voltage on an application by application basis.

5. The method of claim 1, wherein the handheld mobile device further comprises a baseband transceiver module coupled to pseudo-static RAM (PSRAM) and XIP NVM, wherein the method further comprises the step of selectively disabling the PSRAM to further reduce current drain on the handheld mobile electronic device.

6. The method of claim 5, wherein the method further comprises the step of dynamic frequency shifting of a bus clock shared by the baseband transceiver module and pseudo-static RAM (PSRAM) and XIP NVM.

7. The method of claim 5, wherein the method further comprises the step of profiling applications running on the handheld mobile electronic device that uses the baseband transceiver module to enable the dynamic frequency shifting of the bus clock shared by the baseband transceiver module and pseudo-static RAM (PSRAM) and XIP NVM.

8. The method of claim 5, wherein the method further comprises the step of dynamic voltage shifting of a bus voltage of a bus clock shared by the baseband transceiver module and pseudo-static RAM (PSRAM) and XIP NVM based on a profile of an application using the baseband transceiver module.

9. The method of claim 5, wherein the method further comprises the step of selectively disabling the PSRAM to reduce current drain on the handheld mobile electronic device.

10. A system of power management for a handheld mobile electronic device, comprising:
   execute-in-place non-volatile memory (XIP NVM) comprising computer instructions;
   dynamic random access memory (DRAM) coupled to the XIP NVM;
   a processor coupled to the XIP NVM and DRAM, wherein the processor, when executing the computer instructions, cause the processor to:
   executing-in-place an application kernel from the XIP NVM, wherein the application kernel is a subset of a main application code;
   selectively disable the DRAM to reduce current drain on the handheld mobile electronic device, wherein the application kernel from the XIP NVM maintains control of the system while a main application code loads to the DRAM in a background process;
   detect a low power mode for the handheld mobile electronic device;
   store the application kernel in the XIP NVM;
   executing-in-place the application kernel from the XIP NVM upon dectecting the low power mode;
   store and share a state and a context between the application kernel and the main application code in one of the XIP NVM or an internal memory of the processor that is shared between the XIP NVM and the DRAM; and
   dynamically frequency shift a system clock or a bus clock based on a profile of the application.

11. The system of claim 10, wherein the processor is further programmed to dynamically voltage shift a bus voltage based on the profile of the application.

12. The system of claim 11, wherein the processor is further programmed to profile applications running on the handheld mobile electronic device to enable the dynamic voltage shifting of the bus voltage on an application by application basis.

13. The system of claim 10, wherein the handheld mobile device further comprises a baseband transceiver module coupled to pseudo-static RAM (PSRAM) and XIP NVM, wherein the processor is further programmed to selectively disable the PSRAM to further reduce current drain on the handheld mobile electronic device.

14. The system of claim 13, wherein the processor is further programmed to dynamically frequency shift a bus clock shared by the baseband transceiver module and pseudo-static RAM (PSRAM) and XIP NVM.

15. The system of claim 13, wherein the processor is further programmed to profile applications running on the handheld mobile electronic device that uses the baseband transceiver module to enable the dynamic frequency shifting of the bus clock shared by the baseband transceiver module and pseudo-static RAM (PSRAM) and XIP NVM.

16. The system of claim 13, wherein the processor is further programmed to dynamically voltage shift a bus voltage of a bus clock shared by the baseband transceiver module and pseudo-static RAM (PSRAM) and XIP NVM based on a profile of an application using the baseband transceiver module.

17. The system of claim 13, wherein the processor is further programmed to selectively disable the PSRAM to reduce current drain on the handheld mobile electronic device.

18. The system of claim 10, wherein the processor is further programmed to profile applications running on the handheld mobile electronic device to enable the dynamic frequency shifting of the system clock or the bus clock on an application by application basis.

* * * * *